United States Patent
Kim et al.

(10) Patent No.: US 8,305,031 B2
(45) Date of Patent: Nov. 6, 2012

(54) MOBILE TERMINAL AND METHOD FOR CONTROLLING CHARGING THEREOF

(75) Inventors: Hyung Jong Kim, Gunpo-si (KR); Jong Hwan Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 260 days.

(21) Appl. No.: 12/860,039

(22) Filed: Aug. 20, 2010

(65) Prior Publication Data

US 2011/0133687 A1    Jun. 9, 2011

(30) Foreign Application Priority Data

Dec. 7, 2009    (KR) .................. 10-2009-0120464

(51) Int. Cl.
    *H02J 7/00*    (2006.01)
(52) U.S. Cl. ....................................... 320/101
(58) Field of Classification Search .................. 320/101
    See application file for complete search history.

(56) References Cited

U.S. PATENT DOCUMENTS

| | | | | |
|---|---|---|---|---|
| 4,209,735 A * | 6/1980 | Yoshida | ........................ | 320/101 |
| 4,236,068 A * | 11/1980 | Walton | ........................ | 235/380 |
| 4,642,606 A * | 2/1987 | Tsuyama | ........................ | 340/432 |
| 4,711,992 A * | 12/1987 | Sekine | ........................ | 235/145 R |
| 4,742,351 A * | 5/1988 | Suzuki | ........................ | 340/5.54 |
| 4,843,224 A * | 6/1989 | Ohta et al. | ........................ | 235/487 |
| 5,012,220 A * | 4/1991 | Miller | ........................ | 340/7.32 |
| 5,146,068 A * | 9/1992 | Ugawa et al. | ........................ | 235/441 |
| 5,522,540 A * | 6/1996 | Surman | ........................ | 232/17 |
| 5,686,809 A * | 11/1997 | Kimura et al. | ........................ | 320/101 |
| 5,861,817 A * | 1/1999 | Palmer et al. | ........................ | 340/5.91 |
| 6,020,943 A * | 2/2000 | Sonoda et al. | ........................ | 349/61 |
| 6,061,304 A * | 5/2000 | Nagata et al. | ........................ | 368/66 |
| 7,864,151 B1 * | 1/2011 | Yamazaki et al. | ........................ | 345/97 |
| 2001/0023703 A1 * | 9/2001 | Kondo et al. | ........................ | 136/244 |
| 2002/0038667 A1 * | 4/2002 | Kondo et al. | ........................ | 136/293 |
| 2003/0231277 A1 * | 12/2003 | Zhang | ........................ | 349/187 |
| 2004/0062000 A1 * | 4/2004 | Duarte | ........................ | 361/683 |
| 2004/0113903 A1 * | 6/2004 | Mikami et al. | ........................ | 345/204 |
| 2008/0094025 A1 | 4/2008 | Rosenblatt et al. | | |
| 2010/0000134 A1 * | 1/2010 | MacKler | ........................ | 40/492 |
| 2010/0154887 A1 * | 6/2010 | Bullen et al. | ........................ | 136/259 |

FOREIGN PATENT DOCUMENTS

| | | |
|---|---|---|
| EP | 2 129 085 | 12/2009 |
| EP | 2 247 084 | 11/2010 |

OTHER PUBLICATIONS

European Search Report dated May 2, 2011 for Application 10190501.6.

* cited by examiner

*Primary Examiner* — Arun Williams
(74) *Attorney, Agent, or Firm* — KED & Associates, LLP

(57) ABSTRACT

A mobile terminal and a method for controlling charging thereof are disclosed. The mobile terminal sets a partial region of a transparent display unit to an opaque region and the other region to a transparent region if a charging command signal is received, and performs information display operation on the opaque region and solar light transmittive operation for charging using the solar battery on the transparent region.

19 Claims, 35 Drawing Sheets

(a)

(b)

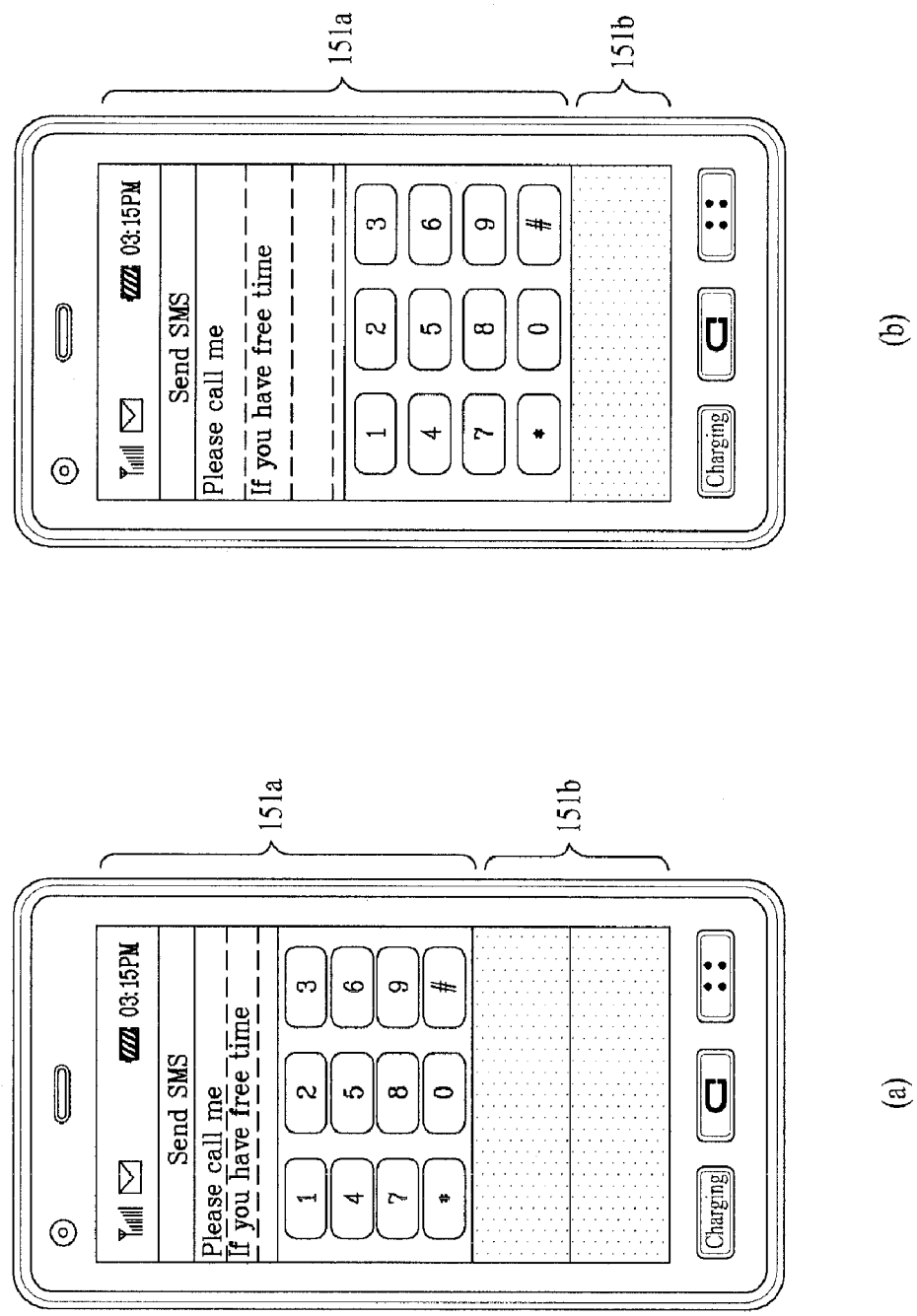

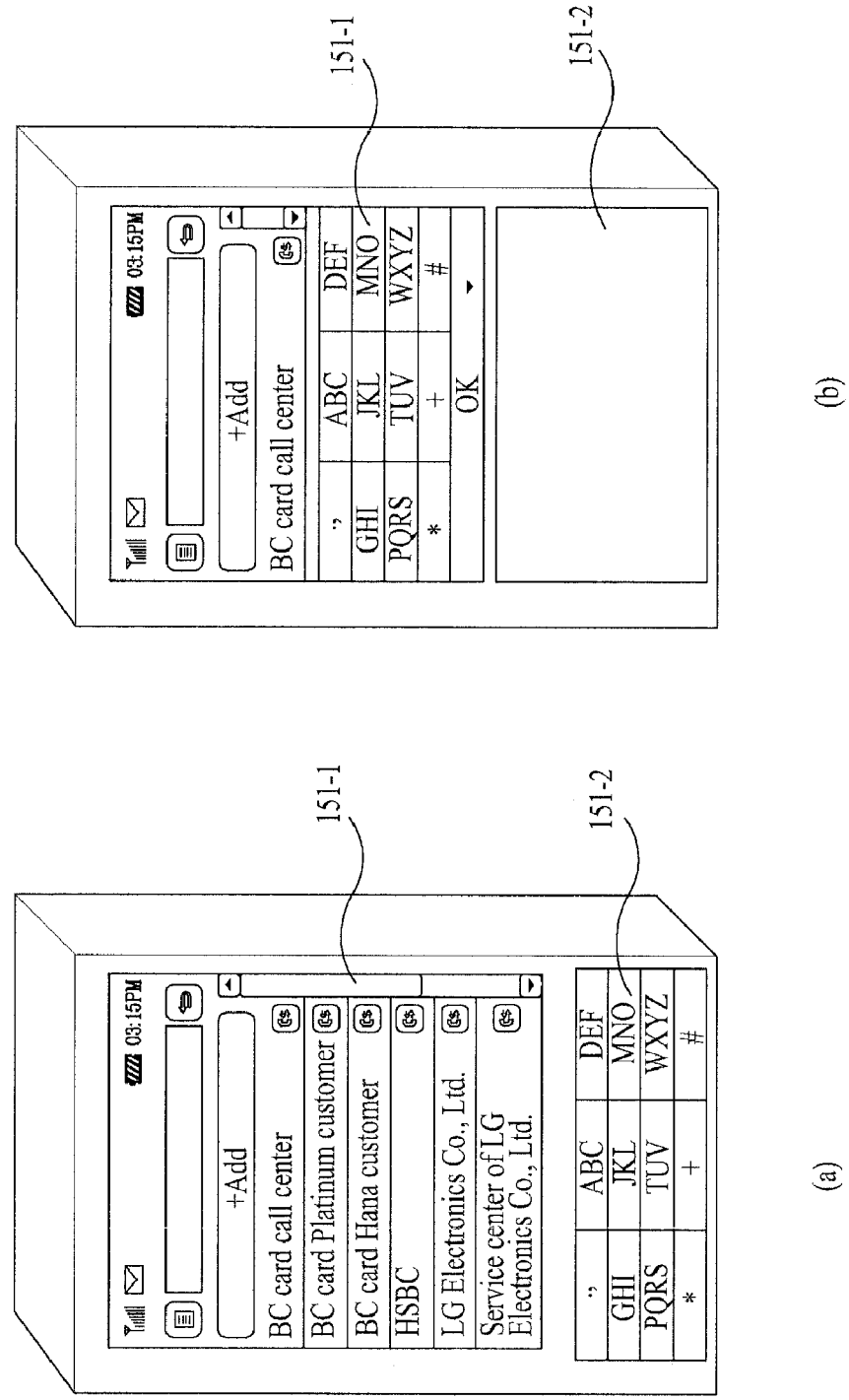

MOBILE TERMINAL AND METHOD FOR CONTROLLING CHARGING THEREOF

CROSS-REFERENCE TO RELATED APPLICATION

This application claims the benefit of the Korean Patent Application No. 10-2009-0120464, filed on Dec. 7, 2009, which is hereby incorporated by reference as if fully set forth herein.

BACKGROUND

1. Field

The present invention relates to a mobile terminal and a method for controlling charging thereof, in which the mobile terminal includes a solar battery and a transparent display unit.

2. Background

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase the terminal functions, it may be able to consider the improvement of structural part and/or software part of the terminal.

According to the related art, a mobile terminal can perform a charging operation by using at least one of a basic battery for a terminal and a solar battery. The solar battery can receive solar light to charge the power generated from the received solar light.

However, in order that the solar battery easily receives solar light, the mobile terminal cannot have a display on a front face of the solar battery, or should have a transparent display means on a front face of the solar battery, wherein the transparent display has transparency of a certain level or greater.

Accordingly, a structure of a terminal, which can perform a transmittive operation of solar light to enter a solar battery while performing a display operation through a display means if the display means is arranged on a front face of the solar battery, will be required.

BRIEF DESCRIPTION OF THE DRAWINGS

The embodiments will be described in detail with reference to the following drawings in which like reference numerals refer to like elements wherein:

FIG. 9A and FIG. 9B are schematic views of a screen controlling an area of an opaque region or a transparent region depending on a charging level of a solar battery in accordance with one embodiment of the present invention;

FIG. 12A to FIG. 12D are schematic views of a screen displaying first and second information using a first display during charging of a solar battery in accordance with one embodiment of the present invention;

DETAILED DESCRIPTION

Figure 1:
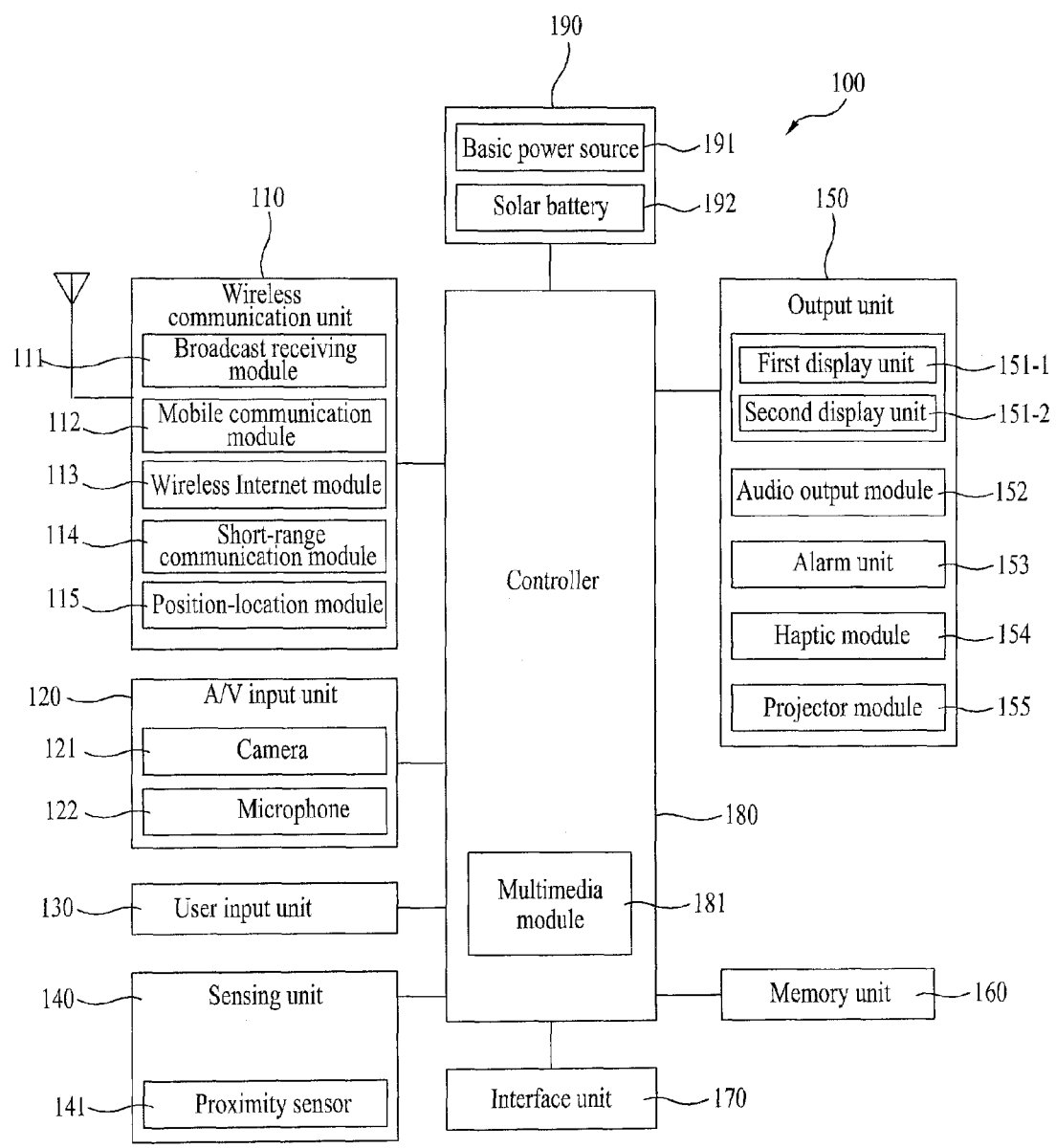
FIG. 1 is a block diagram of a mobile terminal according to one embodiment of the present invention.

Accordingly, the present invention is directed to a mobile terminal and a method for controlling charging thereof, which substantially obviate one or more problems due to limitations and disadvantages of the related art.

An object of the present invention is to provide a mobile terminal and a method for controlling charging thereof, in which the mobile terminal can perform a transmittive operation of solar light to enter a solar battery while performing a display operation through a display means arranged on a front face of the solar battery in a solar battery charging mode.

Another object of the present invention is to provide a mobile terminal and a method for controlling charging thereof, in which the mobile terminal includes two different display means and can perform a transmittive operation of solar light to enter a solar battery by using a second display means while performing an information display operation by using a first display means in a solar battery charging mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the embodiment of the present invention comprises a power supply unit including a solar battery; a transparent display unit arranged on a front face of the solar battery; a user input unit receiving a charging command signal for the solar battery; and a controller setting a partial region of the transparent display unit to an opaque region and the other region to a transparent region if the charging command signal is received, and controlling the transparent display unit to perform information display operation on the opaque region and solar light transmittive operation for charging using the solar battery on the transparent region, wherein the controller controls the solar battery to charge power generated by solar light transmitted through the transparent region.

In another aspect of the present invention, a mobile terminal comprises a power supply unit including a solar battery; a transparent display unit arranged on a front face of the solar battery; and a controller determining whether a remaining power level of the power supply unit is less than a certain reference level, setting a partial region of the transparent display unit to an opaque region and the other region to a transparent region if the remaining power level is less than the certain reference level, and controlling the transparent display unit to perform information display operation on the opaque region and solar light transmittive operation for charging using the solar battery on the transparent region, wherein the controller controls the solar battery to charge power generated by solar light transmitted through the transparent region.

In still another aspect of the present invention, a mobile terminal comprises a power supply unit including a solar battery; a display unit including first and second display units respectively displaying first information and second information, the second display unit being arranged on a front face of the solar battery; a user input unit receiving a charging command signal for the solar battery; and a controller controlling the first display unit to display the first information and the second information if the charging command signal is received, and controlling the second display unit to perform solar light transmittive operation for charging using the solar battery by setting the second display unit to a transparent region, wherein the controller controls the solar battery to charge power generated by solar light transmitted through the second display unit.

In further still another aspect of the present invention, a method for controlling charging of a mobile terminal, which includes a solar battery and a transparent display unit arranged on a front face of the solar battery, comprises receiving a charging command signal for the solar battery; setting a partial region of the transparent display unit to an opaque region and the other region to a transparent region if the charging command signal is received; performing information display operation on the opaque region and solar light transmittive operation for charging using the solar battery on the transparent region; and charging power generated by solar light transmitted through the transparent region by using the solar battery.

In further still another aspect of the present invention, a method for controlling charging of a mobile terminal, which includes a solar battery and a transparent display unit arranged on a front face of the solar battery, comprises determining whether a remaining power level of the mobile terminal is less than a certain reference level; setting a partial region of the transparent display unit to an opaque region and the other region to a transparent region if the remaining power level is less than the certain reference level; performing information display operation on the opaque region and solar light transmittive operation for charging using the solar battery on the transparent region; and charging power generated by solar light transmitted through the transparent region by using the solar battery.

In further still another aspect of the present invention, a method for controlling charging of a mobile terminal, which includes a solar battery and a plurality of display units, comprises displaying first information and second information by respectively using first and second display units of the plurality of display units; receiving a charging command signal for the solar battery; displaying the first information and the second information by using the first display unit if the charging command signal is received; performing solar light transmittive operation for charging using the solar battery by setting the second display unit to a transparent region if the charging command signal is received; and charging power generated by solar light transmitted through the second display unit by using the solar battery.

It is to be understood that both the foregoing general description and the following detailed description of the present invention are exemplary and explanatory and are intended to provide further explanation of the invention as claimed.

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noisegenerated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display unit 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layered structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
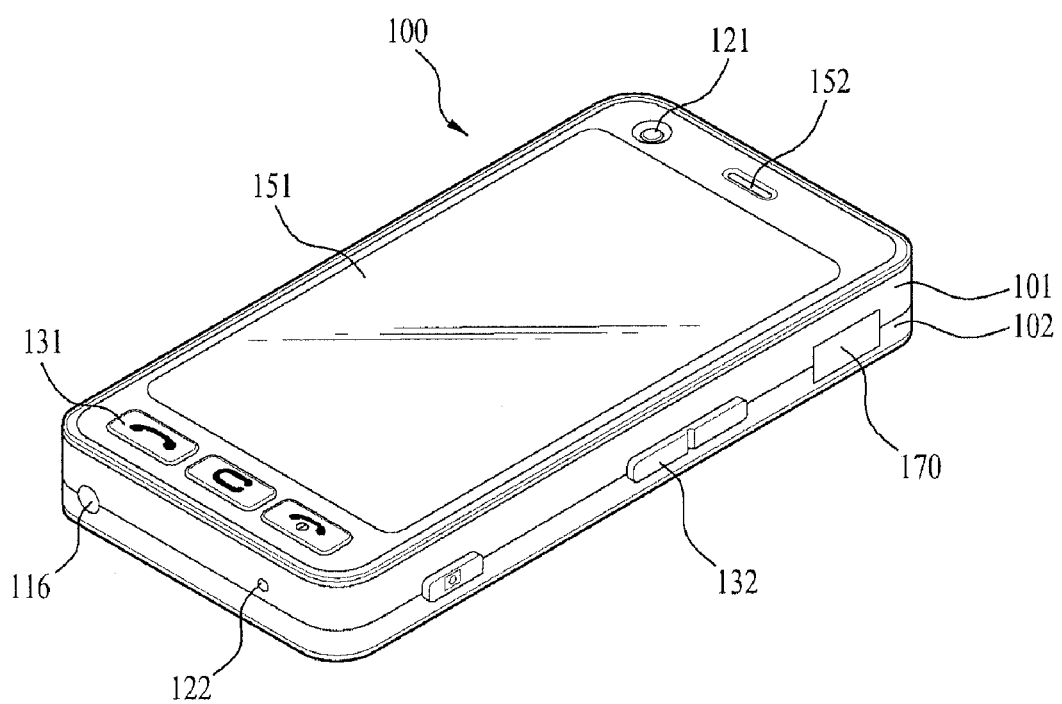
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
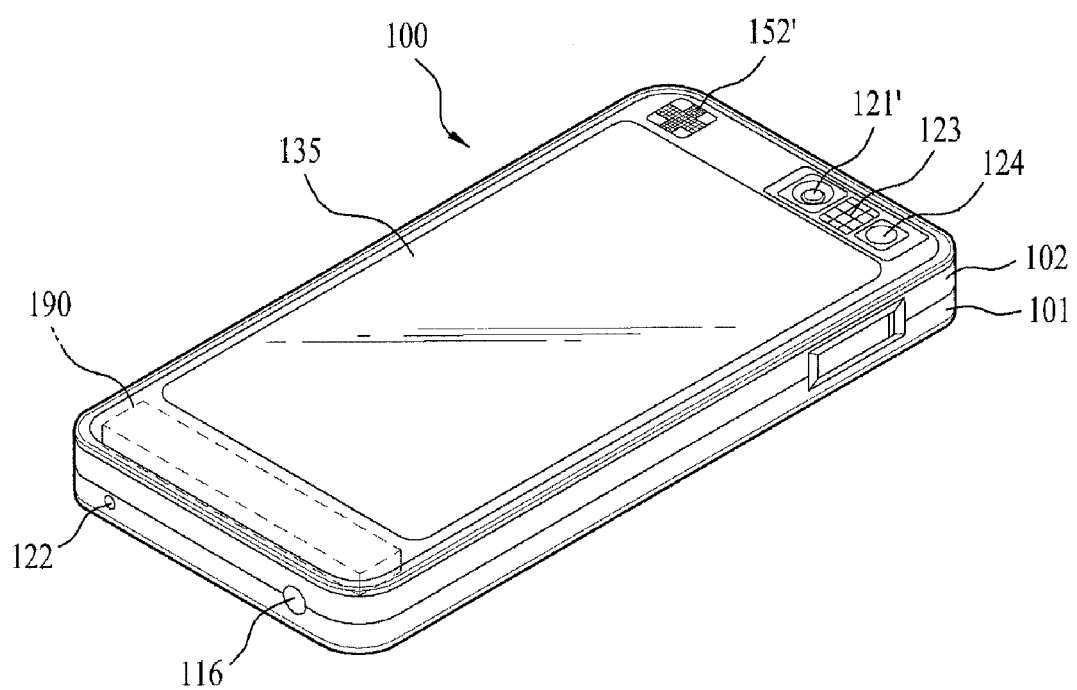
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

It is supposed that the mobile terminal described herein includes at least one of elements shown in FIG. 1.

Also, a solar battery 192 mentioned herein forms a layered structure with a transparent display (for example, TOLED). The transparent display may be arranged on a front surface of the solar battery 192.

In more detail, the solar battery 192 necessarily includes a condensing means for receiving solar light. Also, the solar battery 192 selectively includes a memory means that stores electric energy (or power) converted from solar energy. For example, the electric energy converted from solar energy is stored separately from the power of a basic power source 191 for a terminal if the solar battery includes a separate memory means. The electric energy may be stored in a memory for the power of the basic power source 191 for a terminal together with the power of the basic power source 191 if the solar battery does not include a separate memory means. In particular, if the solar battery includes a separate memory means, information of charging amount or remaining power level of each of the solar battery 192 and the basic power source 191 (basic battery) for a terminal can be provided.

Also, the display unit 151 mentioned herein includes a plurality of display units 151-1 and 151-2, especially transparent display).

For example, the display unit 151 includes an opaque type first display unit 151-1 (for example, LCD) and a transparent type second display unit 151-2 (for example, TOLED). Also, the first and second display units 151-1 and 151-2 may be arranged on the same face (for example, front face) or opposite faces (for example, front/rear faces).

In particular, the transparent display unit can control its transparency, perform solar light transmitting operation at transparency (hereinafter, transparent state) higher than a certain level and information display operation at transparency (hereinafter, opaque state lower than a certain level.

Hereinafter, a structure of a mobile terminal that includes a solar battery 192 and a transparent display unit will be described in detail with reference to FIG. 3A to FIG. 3C. For convenience of description, the second display unit 151-2 will be described as a transparent display unit.

Figure 3A:
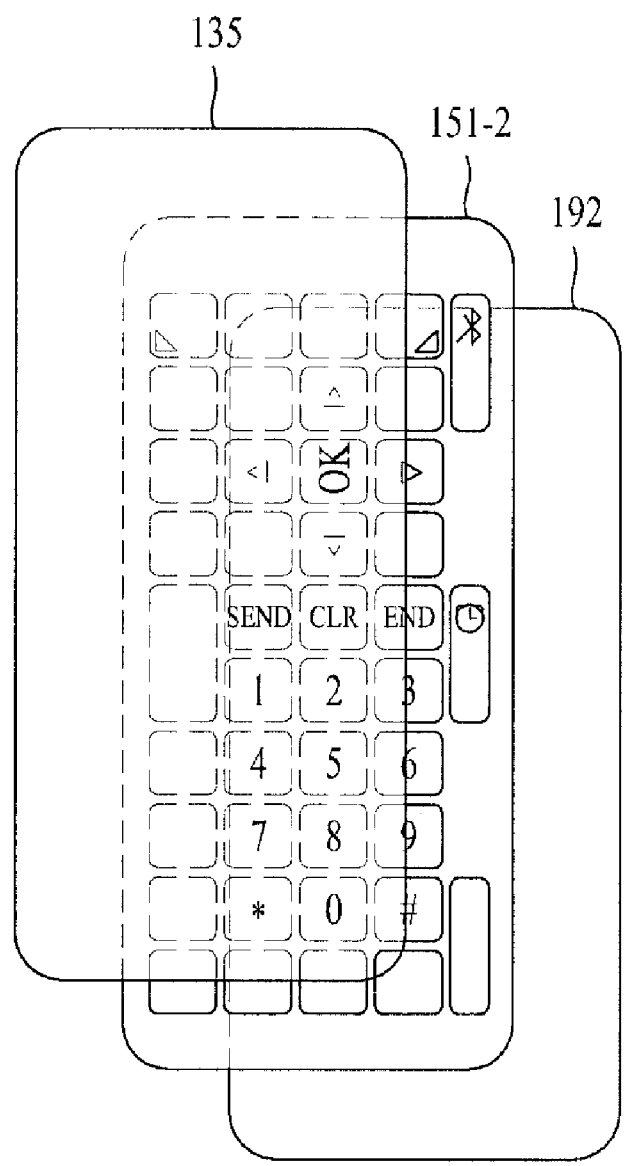
FIG. 3A to FIG. 3C are structural views of a mobile terminal having a solar battery and a transparent display in accordance with one embodiment of the present invention.

Referring to FIG. 3A, the mobile terminal 100 includes a touch pad 135, a transparent display unit 151-2 below the touch pad 135, and a solar battery 192 below the transparent display unit 151-2 to form a layered structure. The touch pad 135 and the transparent display unit 151-2 may be changed to each other in their location.

In this case, the solar battery 192 can receive solar light transmitted through the transparent display unit 151-2 in a state that information is not displayed on the transparent display unit 151-2 or transparency of the transparent display unit 151-2 is higher than a certain level.

Figure 3B:
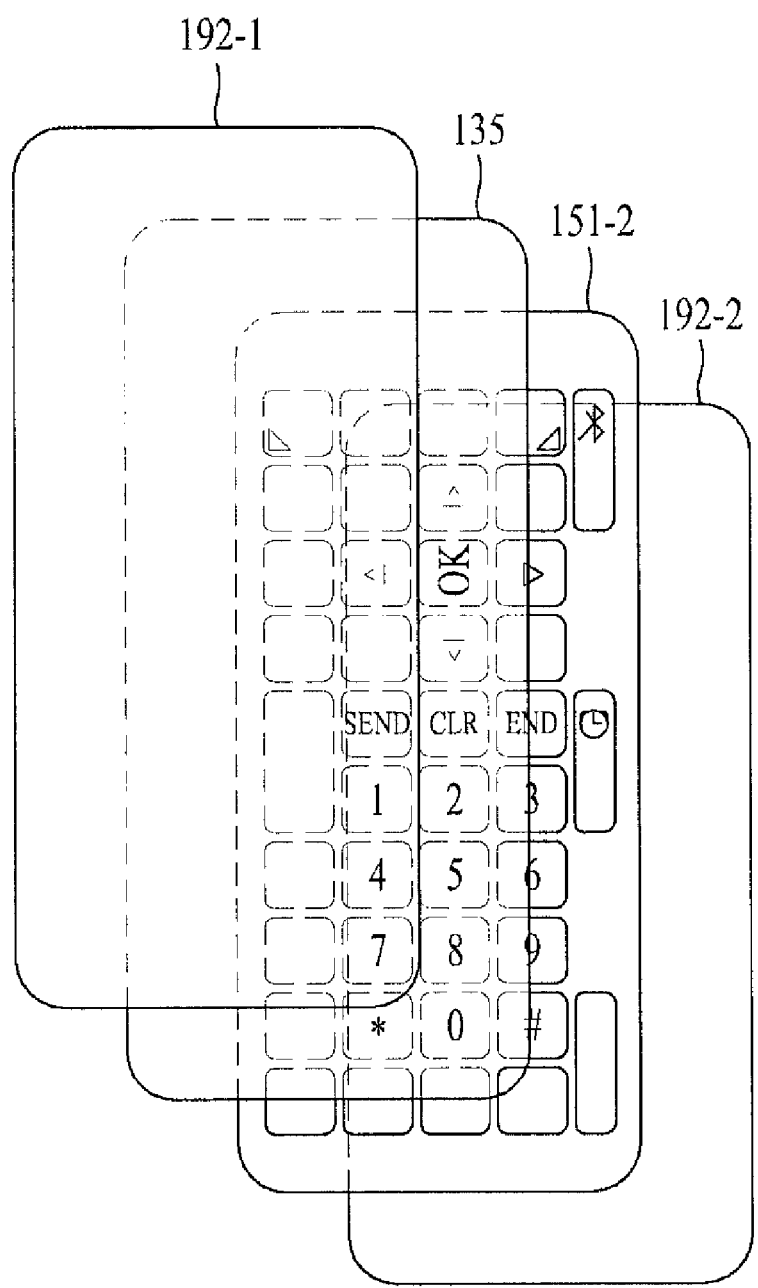

Referring to FIG. 3B, the mobile terminal 100 can include a transparent type condensing means, 192-1, a touch pad 135, a transparent play unit 151-2 below the touch pad 135, and a memory means 192-2 below the transparent display unit 151-2. In this case, the condensing means 192-1 can be provided in a transparent type to obtain readability of the transparent display unit 151-2. The memory means 192-2 can store the power converted from the solar energy by solar light condensed by the condensing means 191-1.

Figure 3C:
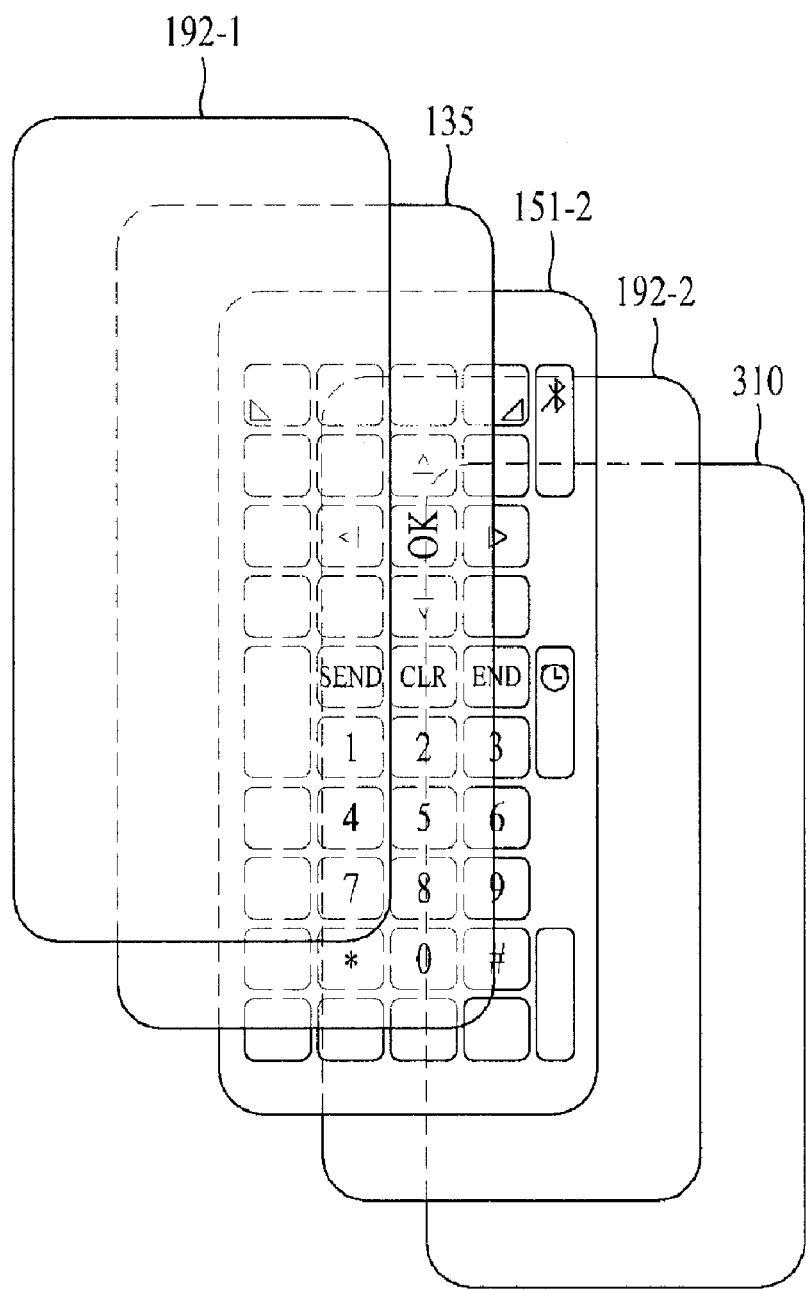

Referring to FIG. 3C, the mobile terminal 100 can include a light emitting device (LED) 310 below the memory means 191-2 while maintaining the structure of FIG. 3B. In this case, the light emitting device 310 can be provided to support backlighting of the transparent display unit 151-2. And, the light emitting device 310 may be arranged below the transparent display unit 151-2 to enhance backlighting effect.

Hereinafter, a method for controlling charging of a mobile terminal according to the present invention will be described with reference to the accompanying drawings.

Figure 4A:
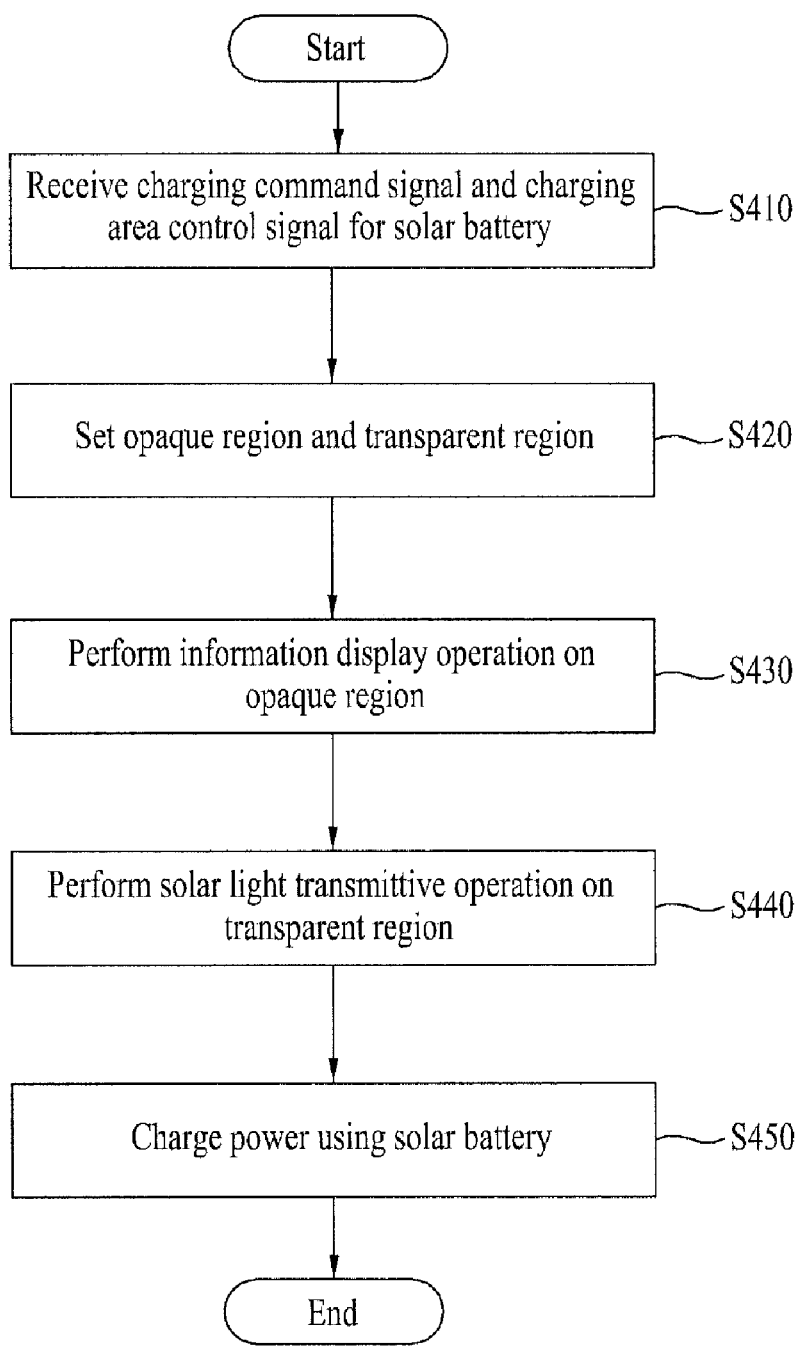
FIG. 4A and FIG. 4B are flow charts of a method for controlling charging of a mobile terminal in accordance with one embodiment of the present invention.
Figure 4B:
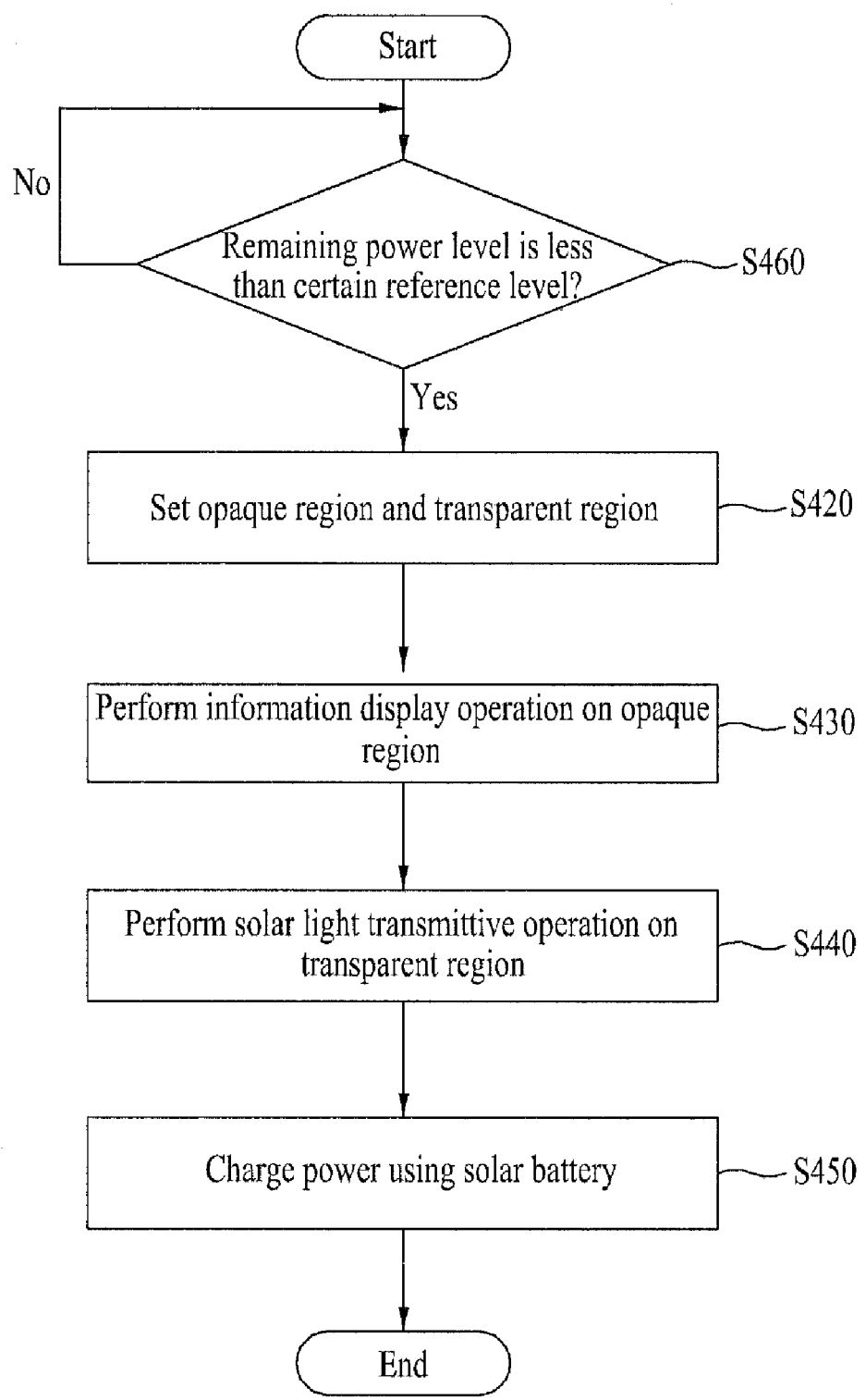

FIG. 4A and FIG. 4B are flow charts of a method for controlling charging of a mobile terminal by using one transparent display unit in accordance with one embodiment of the present invention. In more detail, FIG. 4A illustrates a method for controlling charging when a charging command signal is inputted from a user, and FIG. 4B illustrates a method for controlling charging based on a remaining power level.

For convenience of description, the mobile terminal 100 includes at least one of display units 151-1 and 151-2, especially a transparent display unit mentioned hereinafter. Moreover, the transparent display unit may be operated as a main display unit, or may be provided separately from another display operated as a main display unit. Also, the transparent display unit can be operated as a touch screen by forming a layered structure with the touch pad.

For example, the transparent display unit can include a TOLED.

First of all, referring to FIG. 4A, the mobile terminal 100 receives a charging command signal of the solar battery 192 through the user input unit 130 (S410).

For example, an example of an event (hereinafter, 'charging event') for inputting a charging command signal includes a selection operation of a key provided for input of the charging command signal, a key zone (in case of touch screen), or a menu list. Alternatively, the charging event includes a touch operation (specific touch action, the number of touch times, proximate touch of a certain proximate distance, multi-touch, etc.) of a type corresponding to input of the charging command signal if the transparent display unit and the touch pad constitute a touch screen by forming a layered structure. Also, the charging event includes motion or tilt variation of the terminal if a motion sensor is included in the terminal.

The mobile terminal 100 sets an entire region of the transparent display unit to an opaque region to receive a charging command signal at a display operation state or display operation standby state (or inactive state).

The mobile terminal 100 can set a solar battery charging mode under the control of the controller 180 if the charging command signal is input in the step S410.

If the charging command signal is input in the step S410 (or if a solar battery charging mode is set), the mobile terminal 100 sets a partial region of the transparent display unit to an opaque region or the other region of the transparent display unit to a transparent region under the control of the controller 180 (S420).

In this case, the opaque region means a region where transparency lower than reference transparency that can identify displayed information externally is set, and the transparent region means a region where transparency higher than the reference transparency is set.

If the charging command signal is input, the mobile terminal 100 can respectively set the opaque region and the transparent region to have an area which is previously designated.

For example, the mobile terminal 100 can designate each area of the opaque region and the transparent region when the charging command signal is input, in accordance with user designated action input through the user input unit 130.

If the area of the transparent region is designated to 30% of a total area, the mobile terminal 100 can set each area of the transparent region and the opaque region when the charging command signal is input, to 30% and 70% of the total area, respectively.

Alternatively, the mobile terminal 100 may divide the solar battery 192 into a plurality of regions and designate the divided region corresponding to the transparent region among the divided regions of the solar battery 192. Accordingly, the mobile terminal 100 can set the region corresponding to the designated divided region of the transparent display unit to the transparent region.

Also, the mobile terminal 100 may designate location of the transparent region as well as the area of the transparent region in accordance with user designated action. Accordingly, the transparent region may be located wherever in the transparent display unit.

This will be described in detail with reference to FIG. 5A to FIG. 5D. For convenience of description, the display unit 151 will be supposed as a transparent display unit.

Figure 5A:
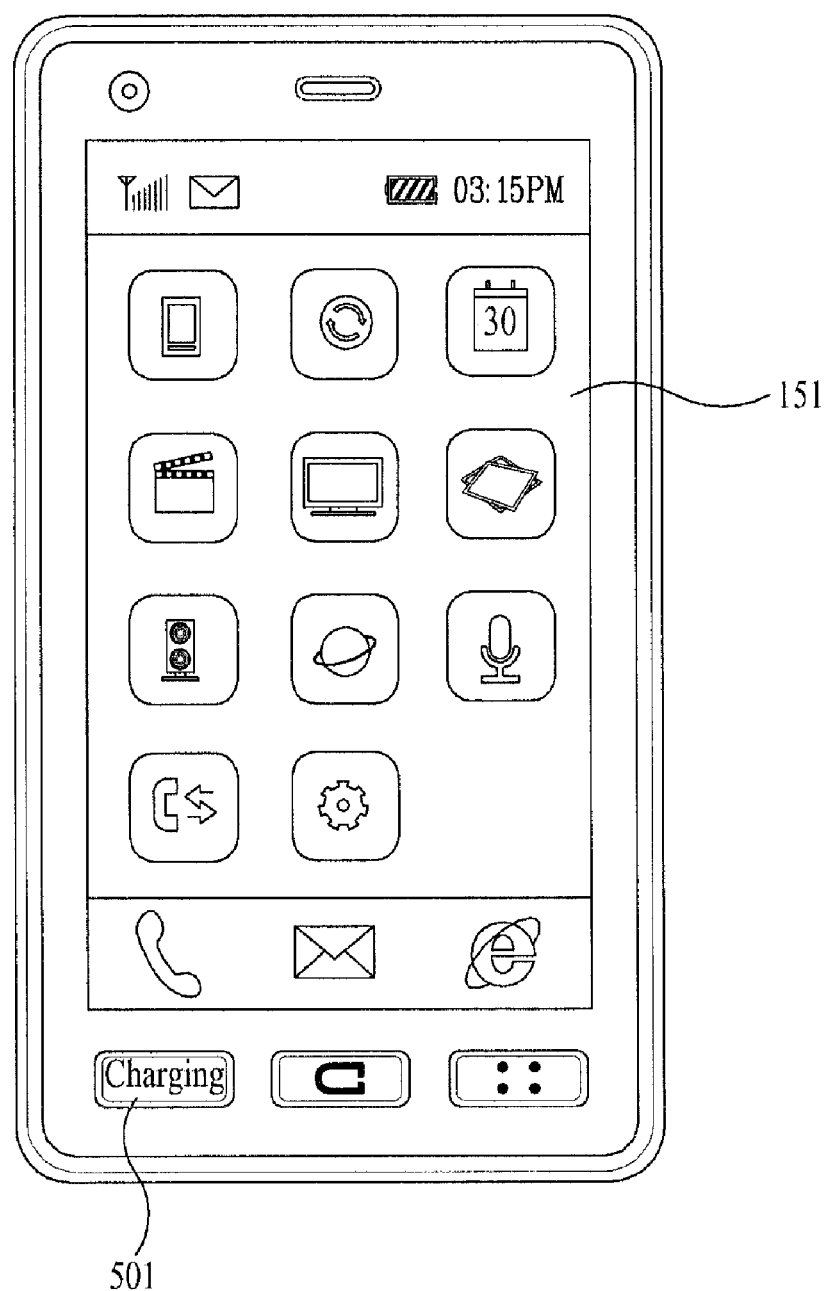
FIG. 5A to FIG. 5D are schematic views of a screen illustrating an input process of a charging command signal in accordance with one embodiment of the present invention.

Referring to FIG. 5A, the mobile terminal 100 includes a key 501 for receiving a charging command signal, and can receive a key selection operation from the user as the charging event.

Figure 5B:
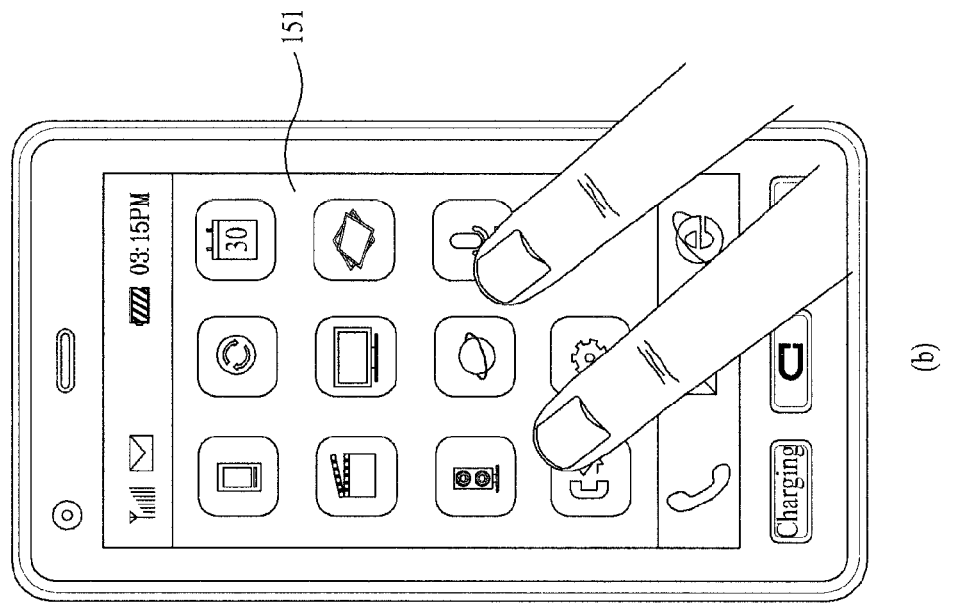
Figure 5B:
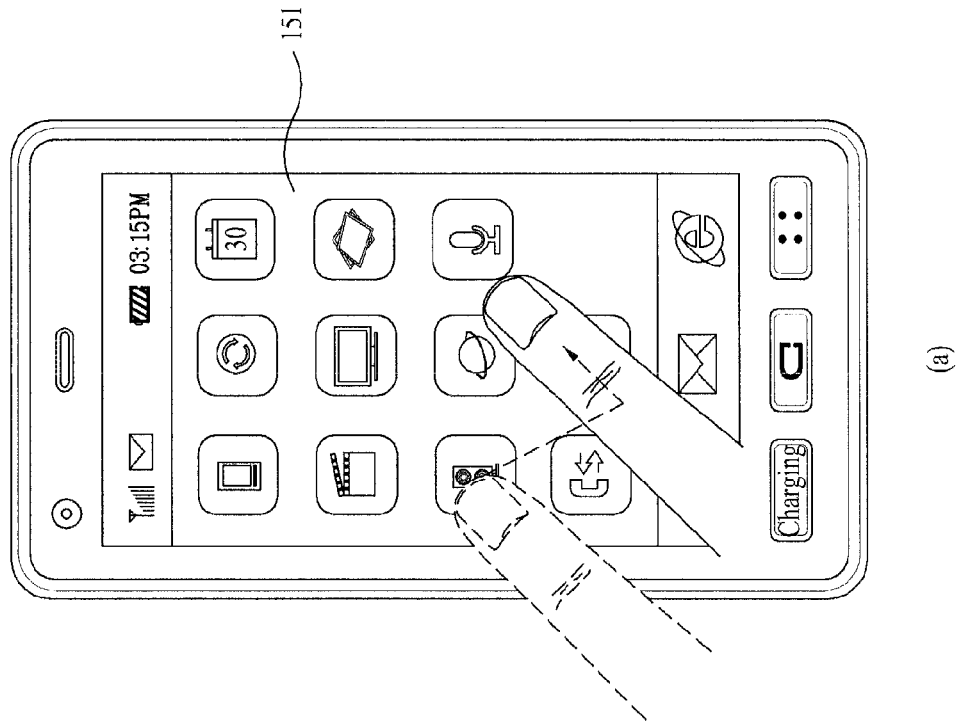

Referring to FIG. 5B, the mobile terminal 100 receives touch action having a specific pattern from the user as the charging event (a), or receives multi-touch action from the user as the charging event (b).

Figure 5C:
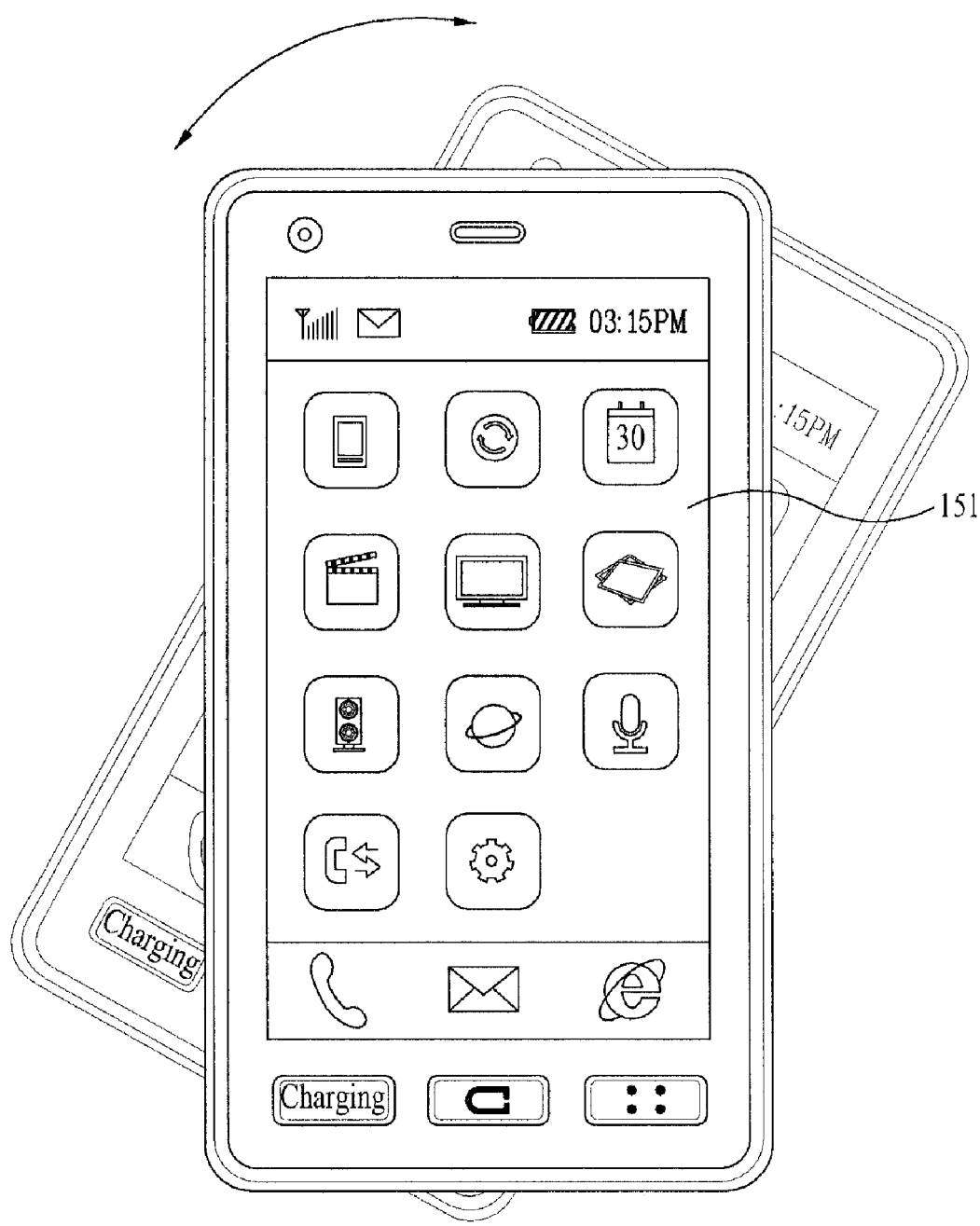

Referring to FIG. 5C, the mobile terminal 100 includes a motion sensor (not shown) for sensing motion of the mobile terminal 100, and can sense motion of the mobile terminal corresponding to the charging event by using the motion sensor.

Figure 5D:
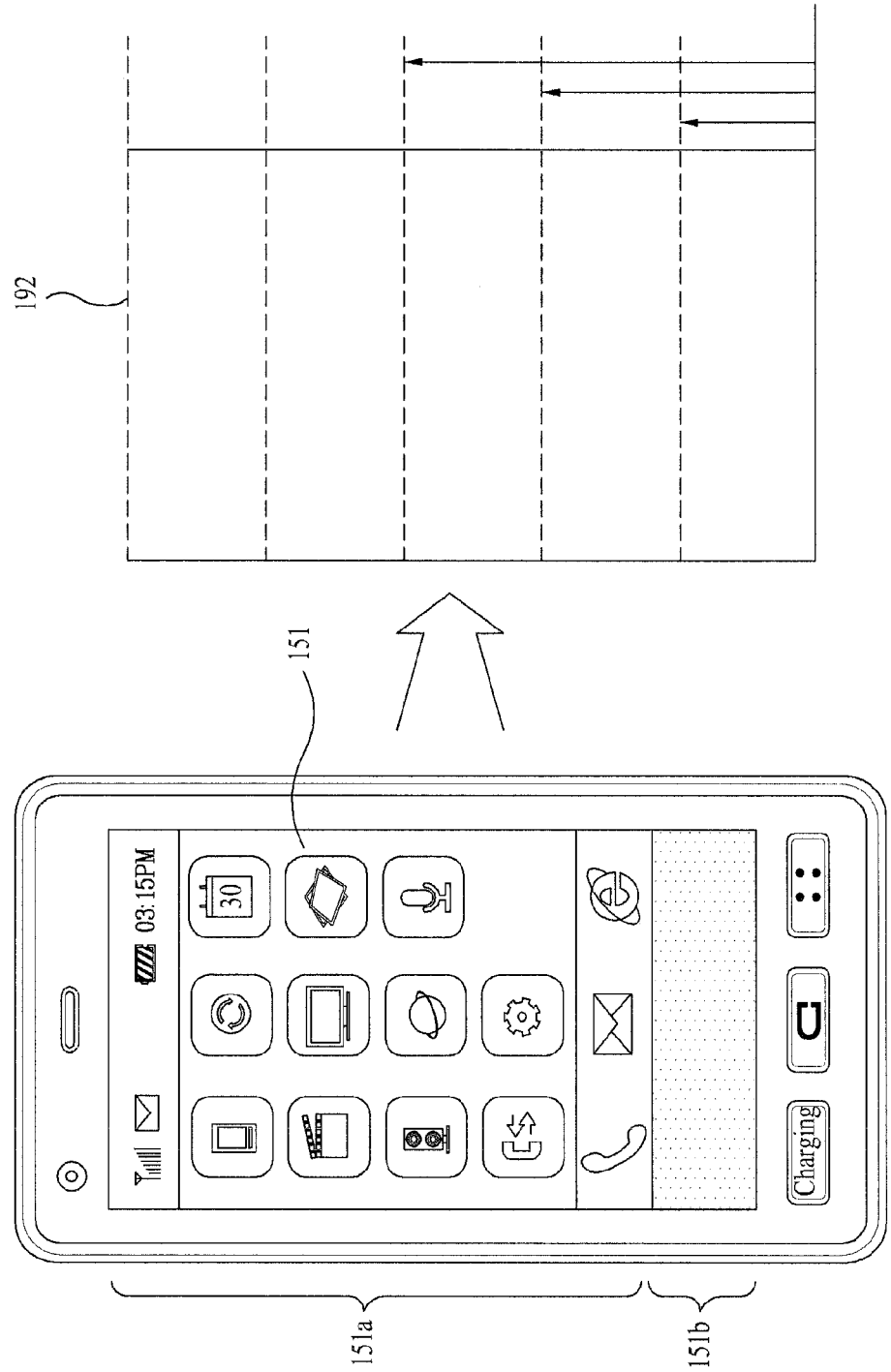

Accordingly, as the charging event shown in FIG. 5A to FIG. 5C is input, the mobile terminal 100 can respectively set the opaque region 151*a* and the transparent region 151*b* for the transparent display unit 151 (FIG. 5D).

Referring to FIG. 5D, if a region corresponding to the first divided region of the solar battery 192 among the total regions of the transparent display unit 151 is previously designated to be set to the transparent region, the mobile terminal 100 can set the region corresponding to the first divided region to the transparent region as the charging command signal is received.

In this case, the region corresponding to the first divided region among the total regions of the transparent display unit 151 may mean a region having the same area as the first divided region among the total regions of the transparent display unit 151 while facing the first divided region.

Returning to the step S410 of FIG. 4, the mobile terminal 100 receives the charging command signal and a charging area control signal through the user input unit 130 (S410).

The mobile terminal 100 can receive the charging area control signal after receiving the charging command signal as above. In this case, the mobile terminal 100 can receive an event (hereinafter, charging area event) for receiving the charging area control signal after receiving the charging event.

Alternatively, the mobile terminal 100 can receive the charging command signal and the charging area control signal at the same time as the charging area event is received. In this case, it is noted that the charging area event includes the charging event.

If the charging command signal and the charging area control signal are received in the step S410, the mobile terminal 100 can set the solar battery charging mode under the control of the controller 180.

If the charging command signal and the charging area control signal are received in the step S410 (or if the solar battery charging mode is set), the mobile terminal 100 can set the opaque region and the transparent region to have the controlled area corresponding to the charging area control signal under the control of the controller 180 (S420).

This will be described in detail with reference to FIG. 6A to FIG. 6D. For convenience of description, it is supposed that the display unit 151 is the transparent display unit.

Figure 6A:
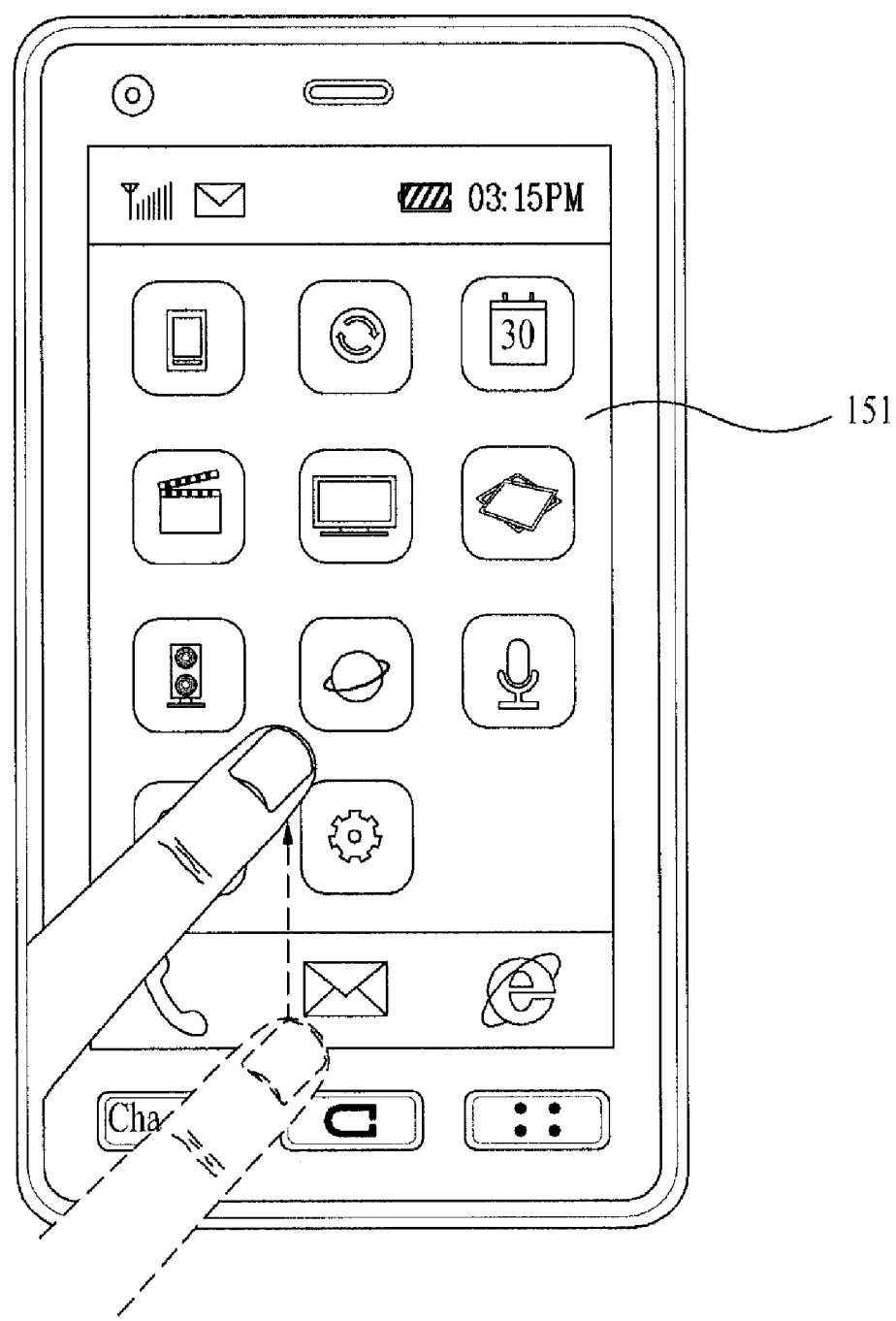
FIG. 6A to FIG. 6D are schematic views of a screen illustrating an input process of a charging area control signal in accordance with one embodiment of the present invention.

Referring to FIG. 6A, the mobile terminal 100 can receive a touch drag action of a certain distance in a certain direction for the transparent display unit 151 from the user as the charging area event. At this time, the charging event could be a touch action before the touch drag action is input, while the charging area event could be the touch drag action.

Figure 6B:
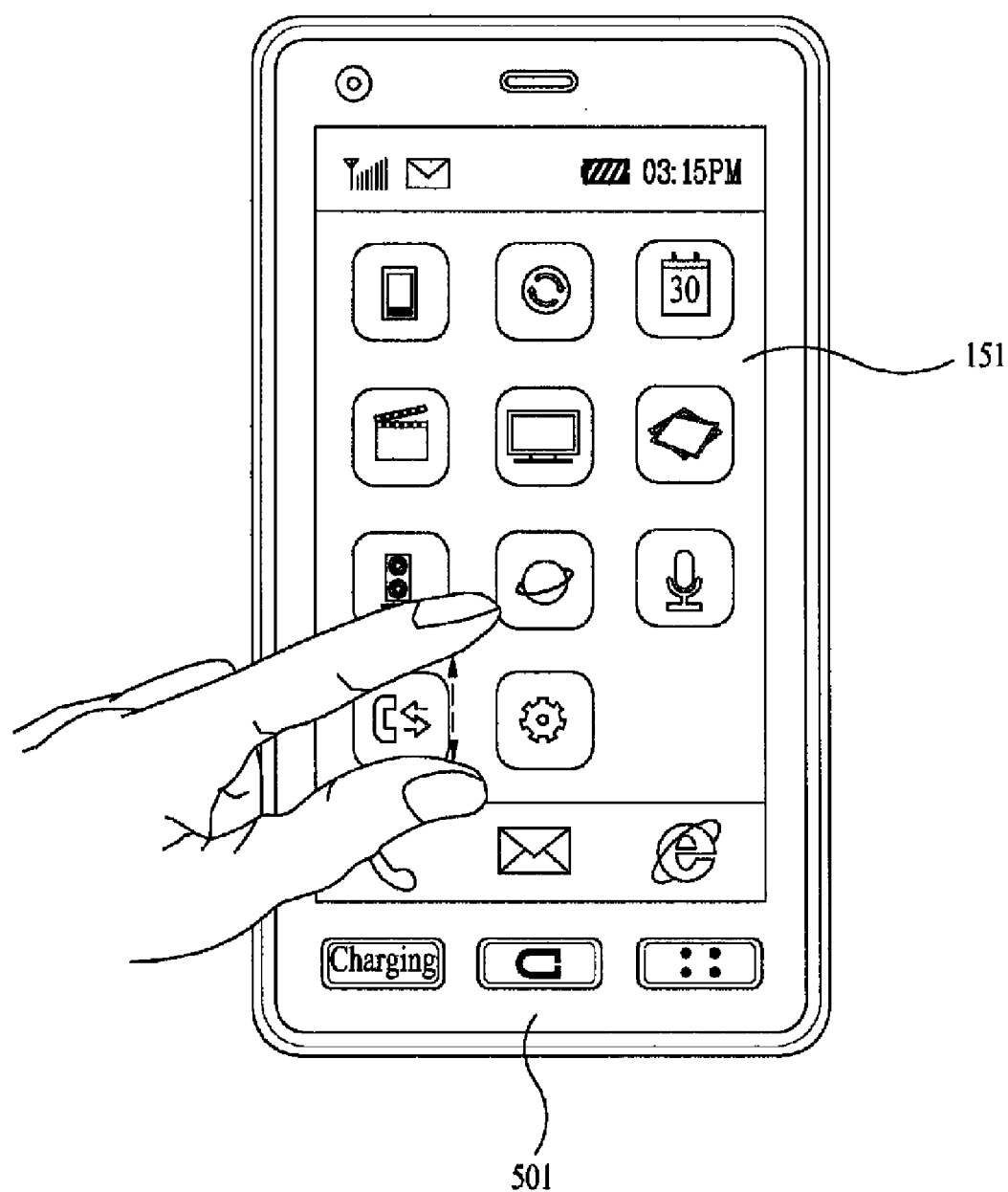

Also, referring to FIG. 6B, the mobile terminal 100 can receive a touch drag action that varies the distance between two pointers at a multi-touch state (two pointers) for the transparent display unit 151, from the user as the charging area event. At this time, the charging event could be the multi-touch action, while the charging area event could be the touch drag action for varying the distance between two pointers.

Figure 6C:
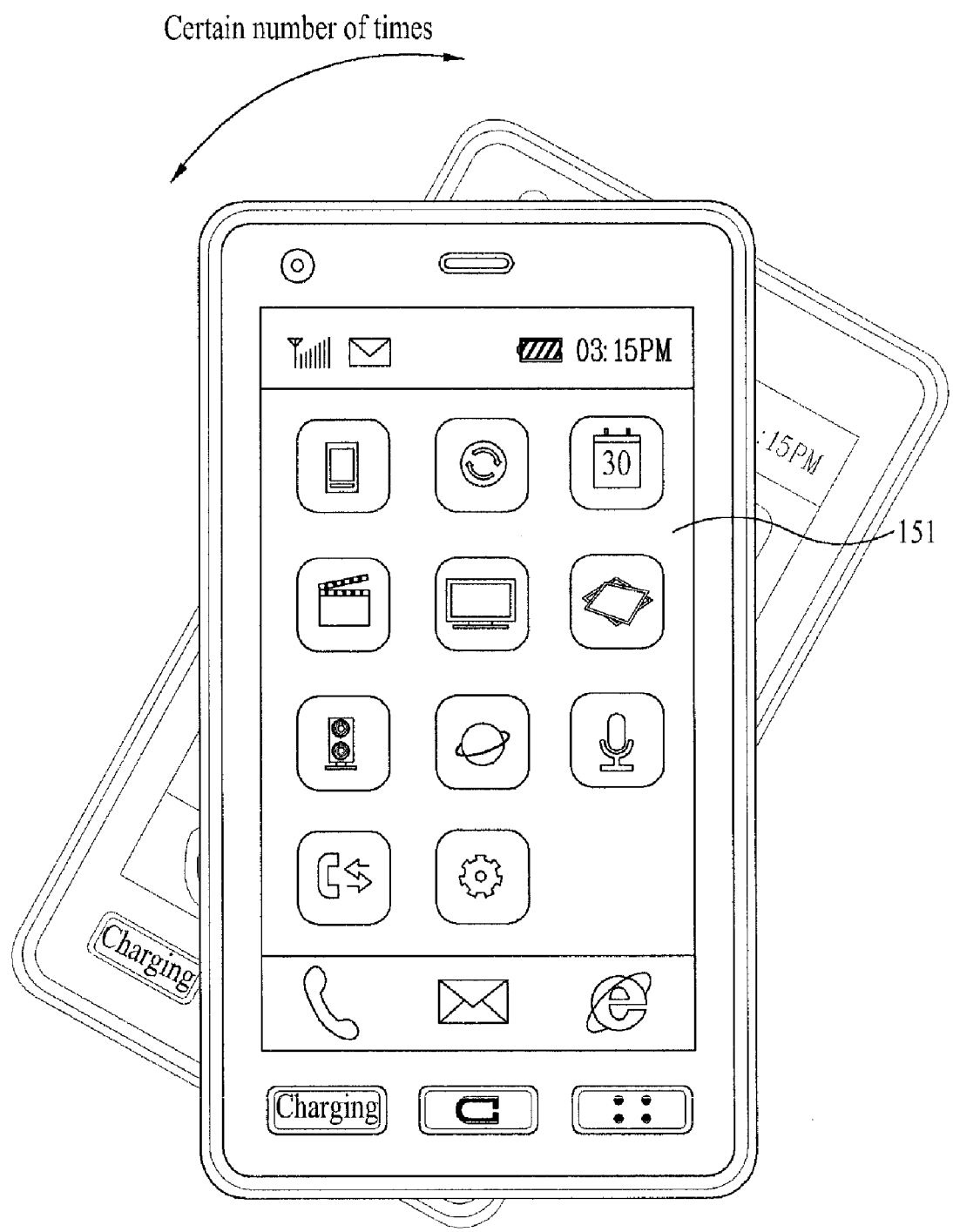

Also, referring to FIG. 6C, the mobile terminal 100 can receive a terminal tapping action of a certain number of times from the user as the charging area event, and can sense the received terminal tapping action of a certain number of times by using the motion sensor. At this time, the charging event could be the terminal tapping action, while the charging area event could be the tapping action of all terminals.

Figure 6D:
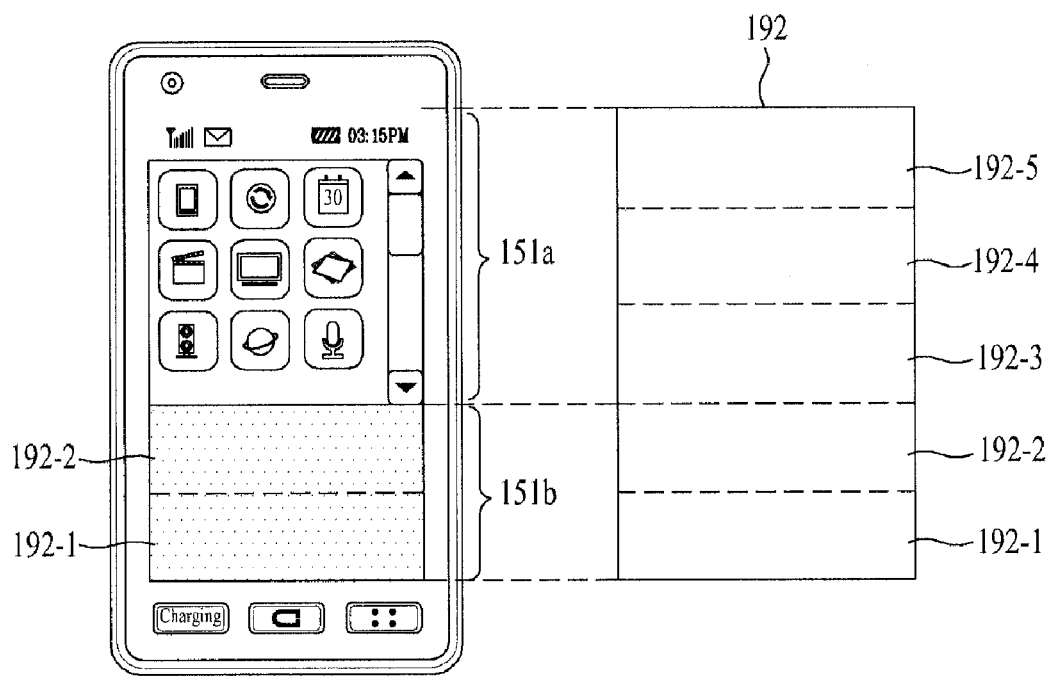
Figure 6D:
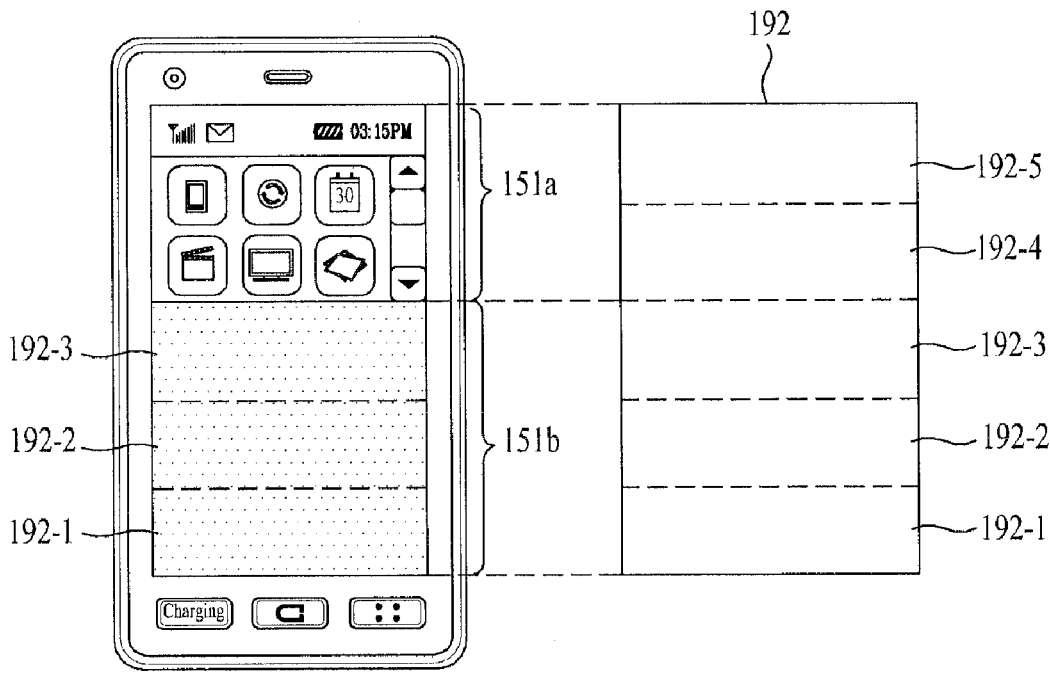

Accordingly, the mobile terminal 100 can set the area corresponding to the distance of touch drag to an area of the transparent region, set the area corresponding to the distance between two pointers at the multi-touch state to the area of the transparent region, or set the area corresponding to the number of times of the terminal tapping action to the area of the transparent region (FIG. 6D).

For example, the greater the distance of the touch drag is, the wider the area of the transparent region can be set. If the direction of the touch drag is upward direction (or downward direction), the area from the lower side (or upper side) to the certain height may be set to the area of the transparent region. Although not shown, if the direction of the touch drag is right direction (or left direction), the area from the right side (or left side) to the certain height may be set to the area of the transparent region.

Also, the mobile terminal 100 may previously designate the number of divided regions of the solar battery 192 per touch drag distance and set the region corresponding to the divided regions to the transparent region, wherein the divided regions correspond to the inputted touch drag distance among the total regions of the transparent display unit 151.

For example, if the distance between two pointers is changed (increased or reduced) at the multi-touch state, the mobile terminal 100 can set the area corresponding to the changed distance to the area of the transparent region. Also, the mobile terminal 100 can set an area of a certain height from the lower side (or upper side) to the area of the transparent region if the motion direction between the pointers is the up-and-down direction. The mobile terminal 100 can set an area of a certain height from the right side (or left side) to the area of the transparent region if the motion direction between the pointers is the left-and-right direction.

Also, the mobile terminal 100 may previously designate the number of divided regions of the solar battery 192 per distance between pointers at the multi-touch state and set the region corresponding to the divided regions to the transparent region, wherein the divided regions correspond to the changed distance among the total regions of the transparent display unit 151.

For example, the mobile terminal may set the area of the transparent region in proportion to the number of times of terminal tapping action. At this time, the mobile terminal can previously designate the number of divided regions of the solar battery 192 per the number of times of terminal tapping action. If the terminal tapping action is one time, the mobile terminal can set the transparent region corresponding to the first divided region of the solar battery 192. If the terminal tapping action is two times, the mobile terminal can set the transparent region corresponding to the first and second divided regions of the solar battery 192. In this case, the number of divided regions corresponding to the region that can be set to the transparent region can previously be designated by the user when the taping action of one time is inputted.

In more detail, referring to FIG. 6D, if the charging command event for increasing the charging area corresponding to one divided region is received in a state that the transparent region corresponding to the first and second divided regions 192-1 and 192-2 among total divided regions 192-1 to 192-5 of the solar battery 192 is set (a), the mobile terminal 100 can set the transparent region corresponding to the first to third divided regions 192-1 to 192-3 by adding the region corresponding to the third divided region 192-3 to the transparent region.

Meanwhile, although not shown, the charging area control signal corresponding to the number of input times of the key 501 for receiving the charging command signal or the number of touch times of a part of the transparent unit may be inputted to the mobile terminal 100.

Next, referring to FIG. 4B, the mobile terminal 100 determines whether the remaining power level of the power supply unit 190 is less than the reference level, under the control of the controller 180 (S470).

At this time, the power supply unit 190 may store the power charged by each of the basic power source 191 and the solar battery 192 in one memory area or separate memory area.

As a result of the step S470, if the remaining power level is less than the reference level, the mobile terminal 100 can set the solar battery charging mode.

Also, if the remaining power level is less than the reference level (or if the solar battery charging mode is set), the mobile terminal 100 can set a part region of the transparent display unit to the opaque region and the other region to the transparent region (S420).

If the remaining power level is less than the reference level after the area of the transparent region or the opaque region is previously designated, the controller 180 can set the transparent region and the opaque region to have the previously designated area.

Also, If the area of the transparent region (or opaque region) per remaining power level is previously designated, the controller 180 can set the transparent region and the opaque region to have the area corresponding to the remaining power level. For example, the smaller the remaining power level is, the greater the area of the transparent region is.

This will be described with reference to FIG. 7A and FIG. 7B. For convenience of description, the display unit 151 could be the transparent display unit.

Figure 7A:
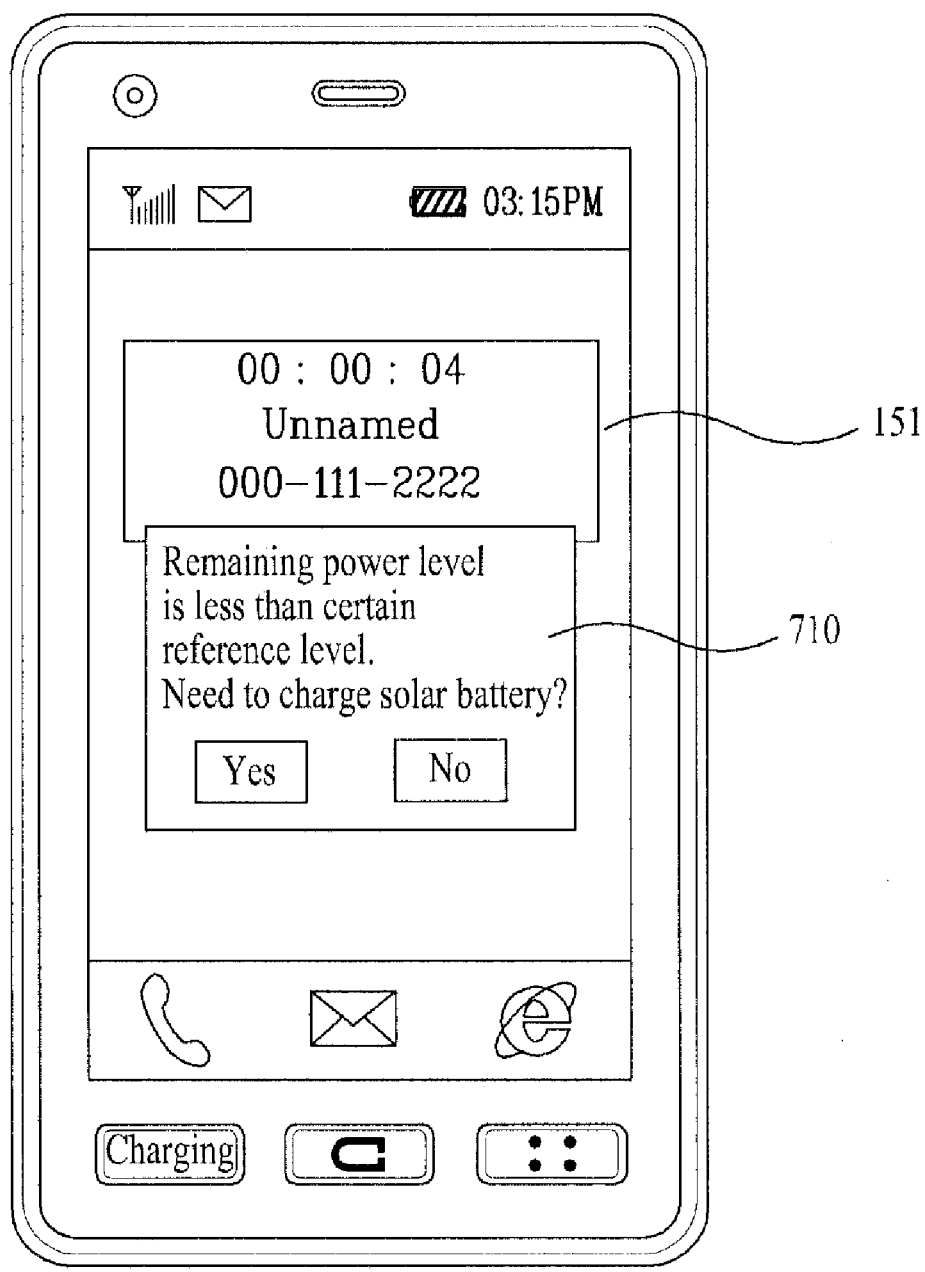
FIG. 7A and FIG. 7B are schematic views of a screen illustrating an input process of a charging area control signal in accordance with one embodiment of the present invention.

Referring to FIG. 7A, if it is determined that the remaining power level is less than the reference level, the mobile terminal 100 can display a popup window 710 that outputs announcement information indicating that that remaining power level is less than the reference level and allows the user to select whether to perform the charging operation using the solar battery.

Figure 7B:
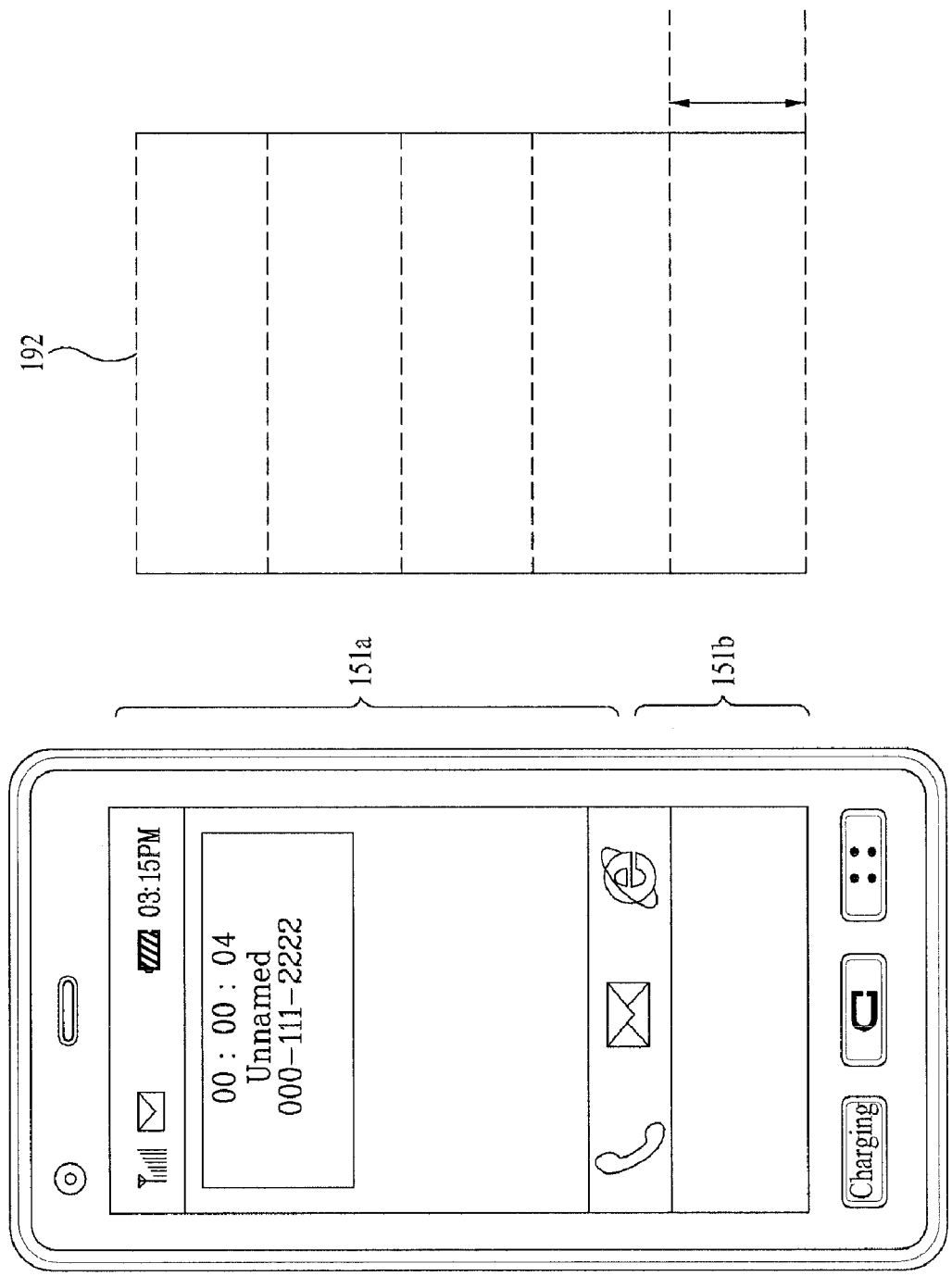

Referring to FIG. 7B, if solar battery charging ('yes') is selected in FIG. 7A, the opaque region 151*a* and the transparent region 151*b* among the total regions of the transparent display unit 151.

Alternatively, if it is determined that the remaining power level is less than the reference level, the mobile terminal 100 can set the opaque region 151*a* and the transparent region 151*b* automatically regardless of user's selection.

Returning to FIG. 4A and FIG. 4B, the process of performing information display operation and solar light transmitting operation using the opaque region and the transparent region set in the step S420 of FIG. 4A and FIG. 4B will be described in detail (see steps subsequent to S430 of FIG. 4A and FIG. 4B).

Referring to FIG. 4A and FIG. 4B, the mobile terminal 100 performs information display operation at the opaque region of the transparent display unit under the control of the controller 180 (S430).

The mobile terminal 100 can display information at only the opaque region if information in respect of terminal action is needed to be displayed. Namely, the mobile terminal 100 does not perform information display operation at the transparent region.

If the charging command signal or the charging area control signal is received in the middle of displaying the first screen using the transparent display unit, the mobile terminal 100 can display the first screen at the opaque region by reducing it or scroll display the first screen at the opaque region while maintaining the size of the first screen as it is.

This will be described in detail with reference to FIG. 8A and FIG. 8B.

Figure 8A:
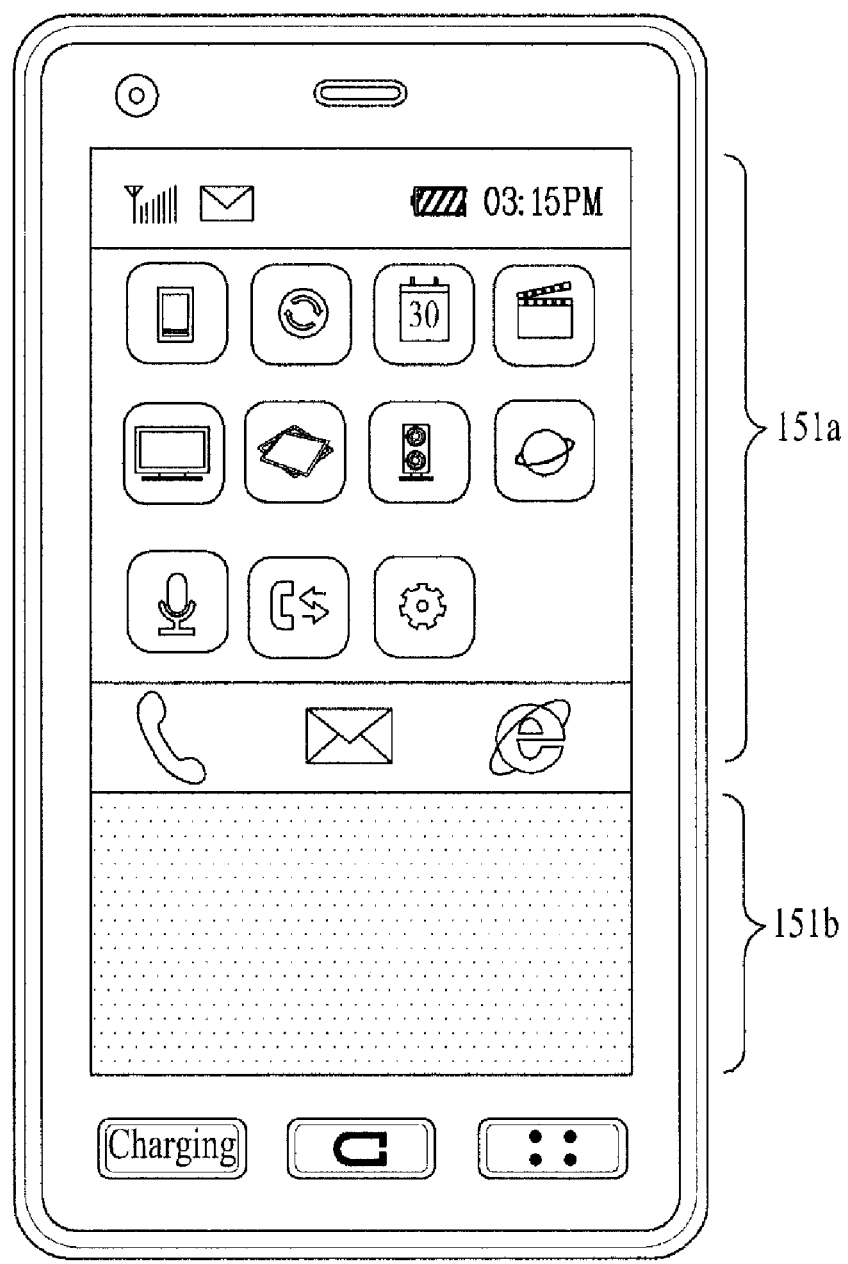
FIG. 8A and FIG. 8B are schematic views of a screen illustrating a display state in an opaque region in accordance with one embodiment of the present invention.

Referring to FIG. 8A, if the charging command signal (or charging area control signal) is received in a state that the first screen is displayed (see FIG. 5A), the mobile terminal 100 reduces the size of the first screen to match the size of the opaque region 151a and displays the reduced first screen on the opaque region 151aAccordingly, the mobile terminal 100 reduces the size of the first screen but does not reduce information provided by the first screen.

Figure 8B:
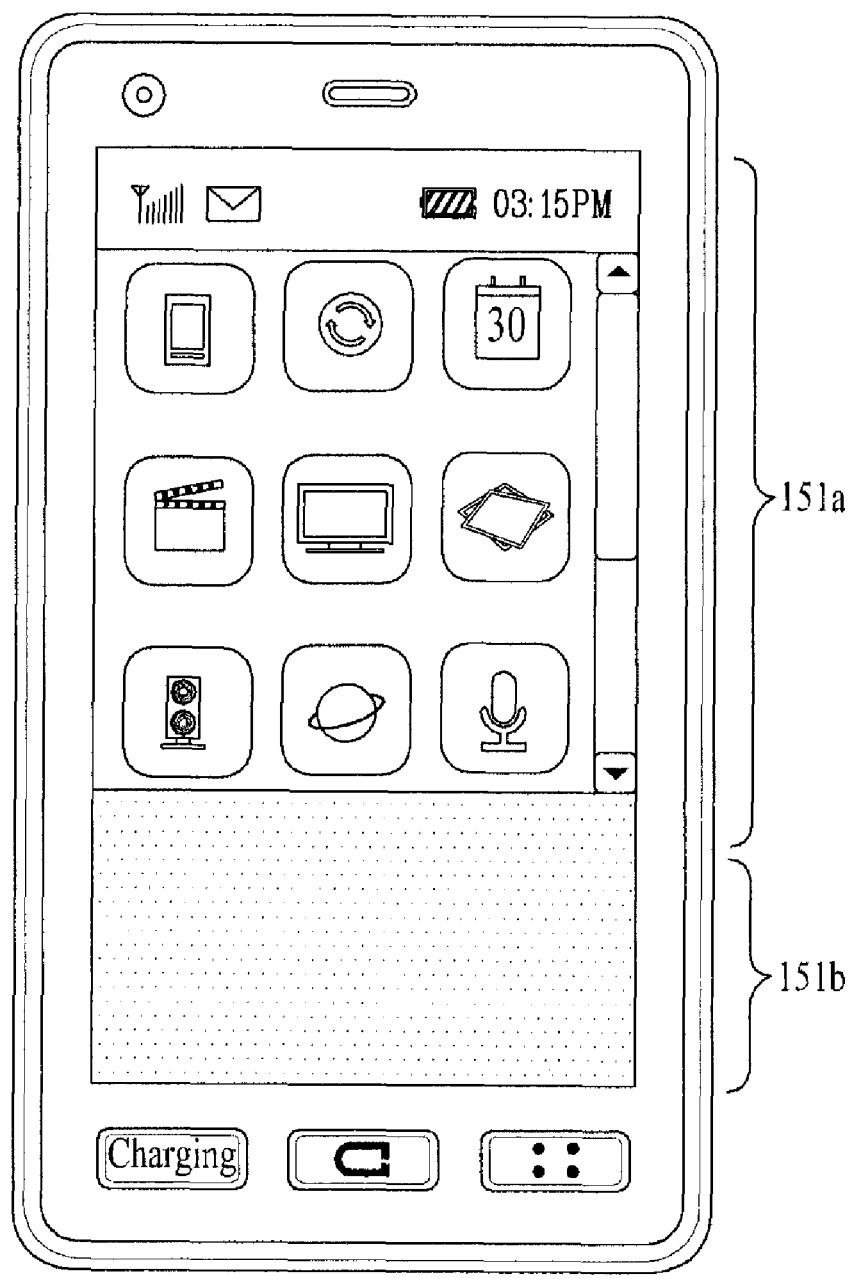

Alternatively, referring to FIG. 8B, if the charging command signal is received in a state that the first screen is displayed, the mobile terminal 100 can scroll display the first screen on the opaque region 151a while maintaining the size of the first screen as it is. Accordingly, the mobile terminal 100 can display a partial region of the first screen, and can display another region of the first screen to correspond to scroll bar manipulated by the user.

Meanwhile, although not shown, if a display command signal of predetermined information is received in a state that the opaque region and the transparent region are set, the mobile terminal 100 can display the predetermined information by reducing the size of the predetermined information to match the size of the opaque region or scroll display the predetermined information within the opaque region while maintaining the size of the predetermined information.

Returning to FIG. 4A and FIG. 4B, the mobile terminal 100 performs solar light transmitting operation for charging using the solar battery 192 at the transparent region of the transparent display unit under the control of the controller 180 (S440).

The mobile terminal 100 charges the power generated by the solar light transmitted through the transparent region by using the solar battery 192 under the control of the controller 180 (S450).

As described above, the solar battery 192 is provided below the transparent display unit to form a layered structure with the transparent display unit, and has the same area as that of the transparent display unit. Accordingly, the solar battery 192 can perform the charging operation by receiving solar light using the area facing the transparent region among the total areas of the solar battery 192. This means that the wider the area of the transparent region is, the wider the area of the solar battery used for solar light charging action is.

As the solar light charging action is performed using the solar battery 192, the mobile terminal 100 can control the areas of the opaque region and the transparent region in accordance with charging level of the solar battery 192.

For example, if the charging level of the solar battery 192 is greater than the first reference level, the mobile terminal can reduce the area of the transparent region at a certain rate. And, if the charging level of the solar battery 192 is less than the second reference level (less than the first reference), the mobile terminal can enlarge the area of the transparent region at a certain rate. Also, if the charging level of the solar battery 192 is between the first reference level and the second reference level, the areas of the opaque region and the transparent region can be maintained as the levels set in the step S420.

This will be described in detail with reference to FIG. 9A and FIG. 9B.

For convenience of description, it is supposed that the area is subdivided into the 1-1th reference level and 1-2th reference level in due order within the range of the first reference level or greater. Also, it is supposed that the area is subdivided into the 2-1th reference level and 2-2th reference level in due order within the range of the second reference level or less.

Also, the solar battery 192 can be divided into a total of five regions, wherein respective areas of the divided regions are the same as one another. The areas of the divided regions may be different from one another.

In a state that the transparent region 151b corresponding to the first to third divided regions of the five divided regions of the solar battery 192 is set, if the charging level of the solar battery 192 is greater than the 1-1th reference level, the mobile terminal 100 can set the transparent region 151b by reducing it to the region corresponding to the first and second divided regions (see (a) of FIG. 9A).

Also, if the charging level of the solar battery 192 is enlarged from the 1-1th reference level or greater to the 1-2th reference level or greater, the mobile terminal 100 can set the transparent region 151b by reducing it to the region corresponding to the first divided region (see (b) of FIG. 9A).

Meanwhile, in a state that the transparent region 151b corresponding to the first divided region is set (see (b) of FIG. 9A), if the charging level of the solar battery 192 is reduced from the 2-1th reference level or less to the 2-2th reference level or less (or if the 2-1th reference level or less is maintained for a certain time period), the mobile terminal 100 can set the transparent region 151b by enlarging it to the region corresponding to the first and second divided regions (see (a) of FIG. 9A). This is to perform solar light transmittive operation of the solar battery 192 more desirably by enlarging the transparent region 151b if the solar light transmittive operation is not performed desirably.

Figure 9B:
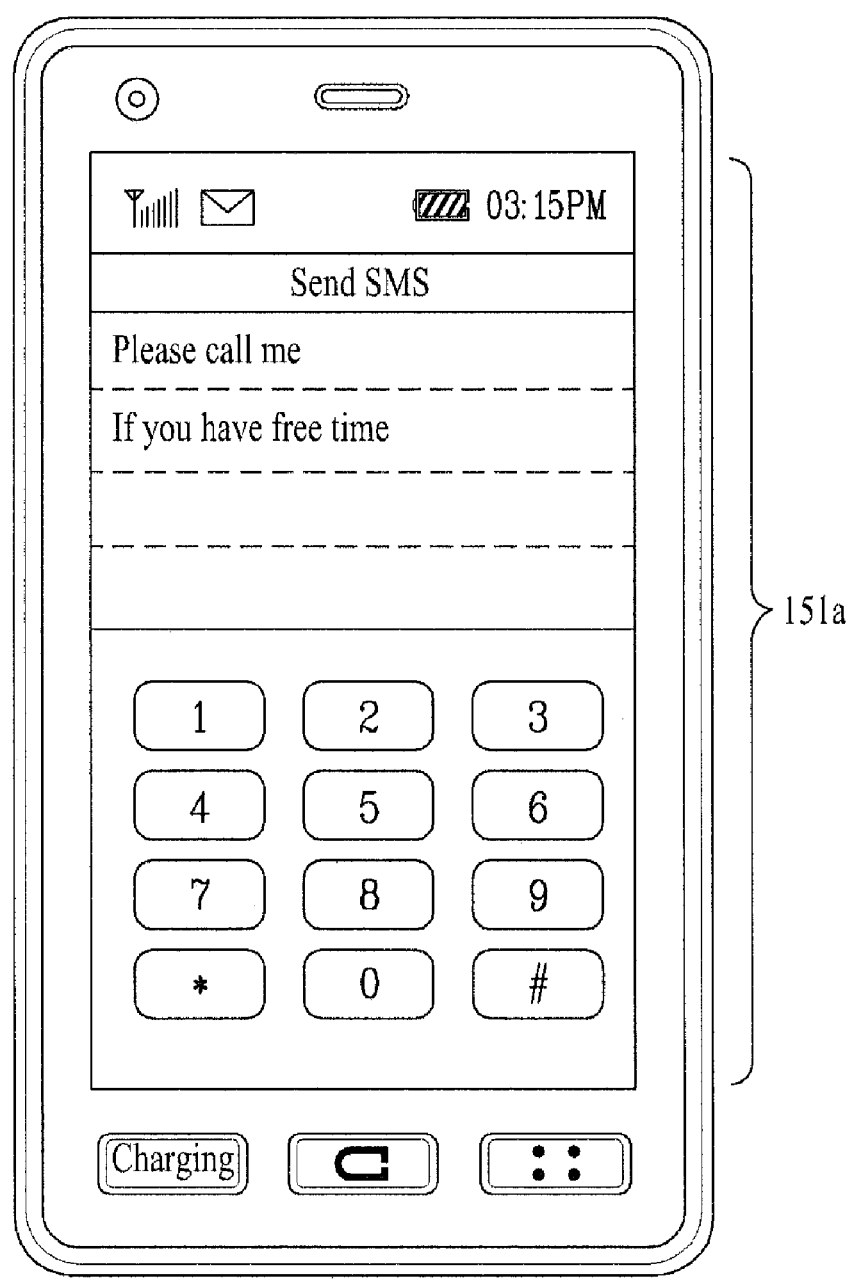

Also, as shown in FIG. 9B, if the charging level of the solar battery 192 is more than a certain level (for example, full charging level or 90% of full charging level), the mobile terminal 100 releases setup of the transparent region 151b and sets the transparent display unit 151 to the opaque region 151a.

Also, the mobile terminal 100 can display an indicator (hereinafter, 'charging indicator') indicating the charging level of the solar battery 192 as the solar battery charging operation is performed using the solar battery 192.

The mobile terminal 100 may output oscillation, alarm bell, lamp (color, brightness, twinkle level, etc.), and announcement message/image as well as the charging indicator to indicate the charging level of the solar battery 192.

This will be described in detail with reference to FIG. 10A and FIG. 10B.

Figure 10A:
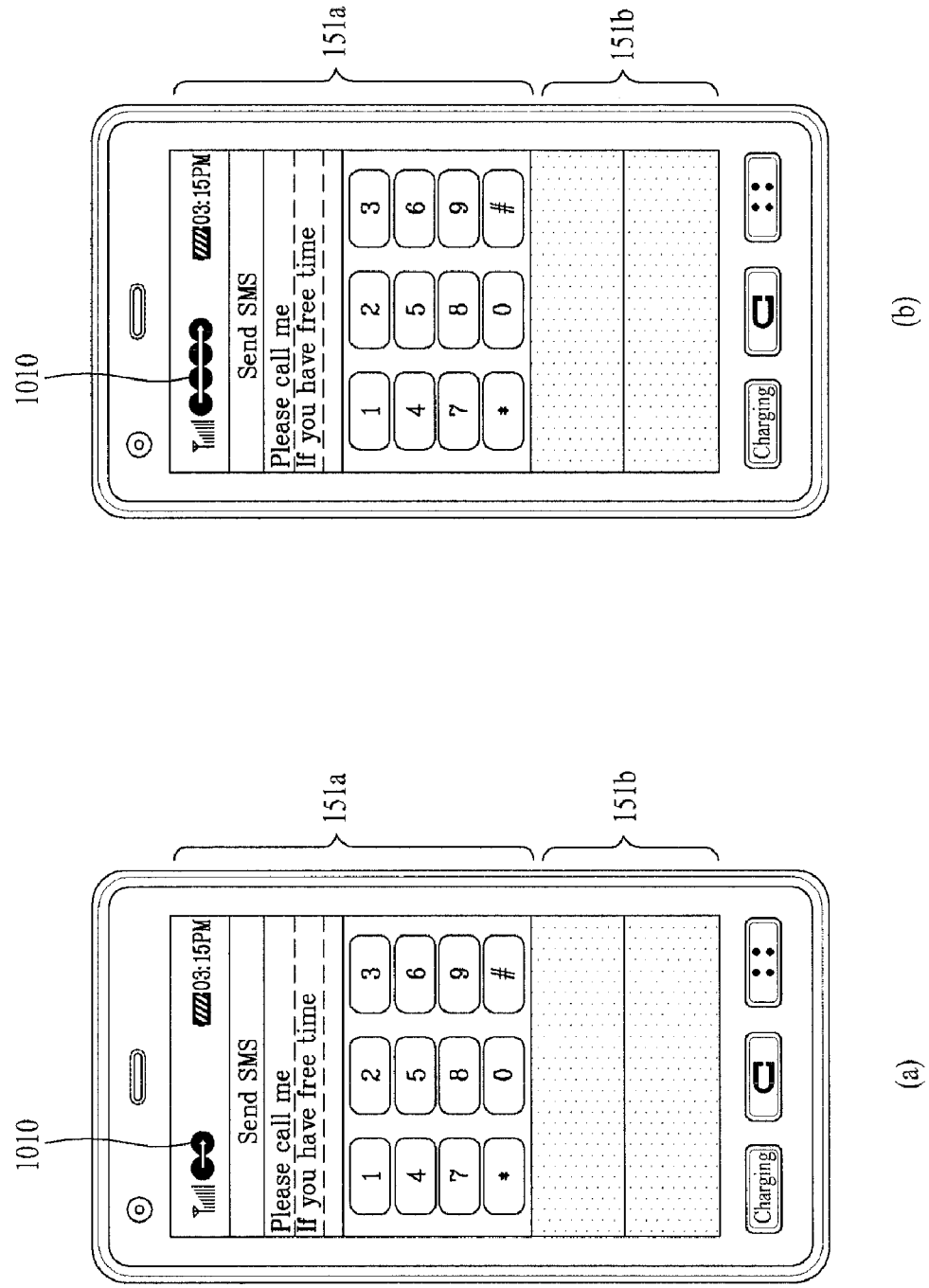
FIG. 10A and FIG. 10B are schematic views of a screen displaying an indicator indicating a charging level of a solar battery in accordance with one embodiment of the present invention.
Figure 10B:
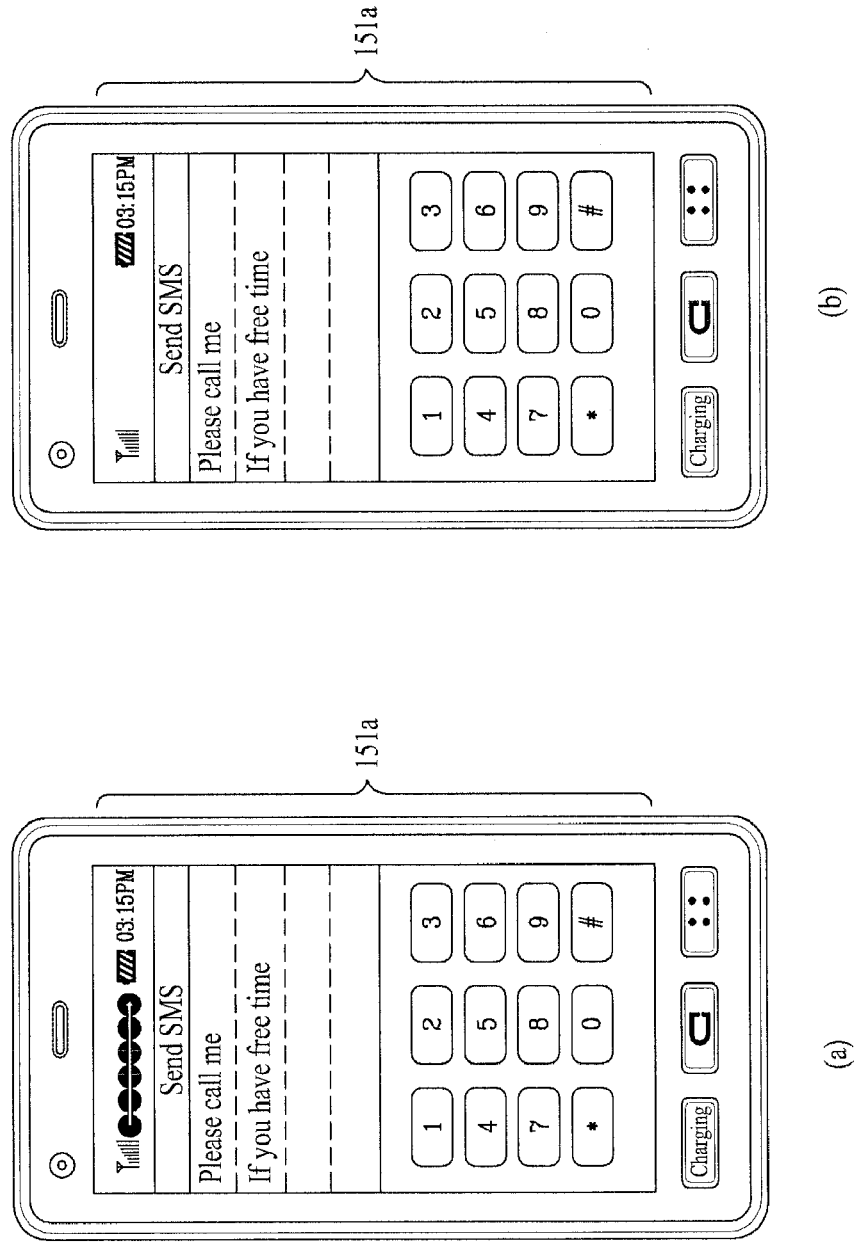

Referring to FIG. 10A and FIG. 10B, the mobile terminal 100 can display the charging indicator 1010 and increase the number of charging indicators 1010 if the charging level increases. Accordingly, the user can identify the increased state of the charging level.

For example, if the charging level increases to 40%, 60%, and 80% of the full charging state, the mobile terminal 100 can increase the number of charging indicators 1010 to 2, 4, and 6 to correspond to the respective charging levels.

Moreover, as described above, if the charging level reaches the full charging state, the mobile terminal 100 may set the transparent display unit 151 to the opaque region 151a by stopping displaying the charging indicator 1011 (FIG. 10B).

Figure 11:
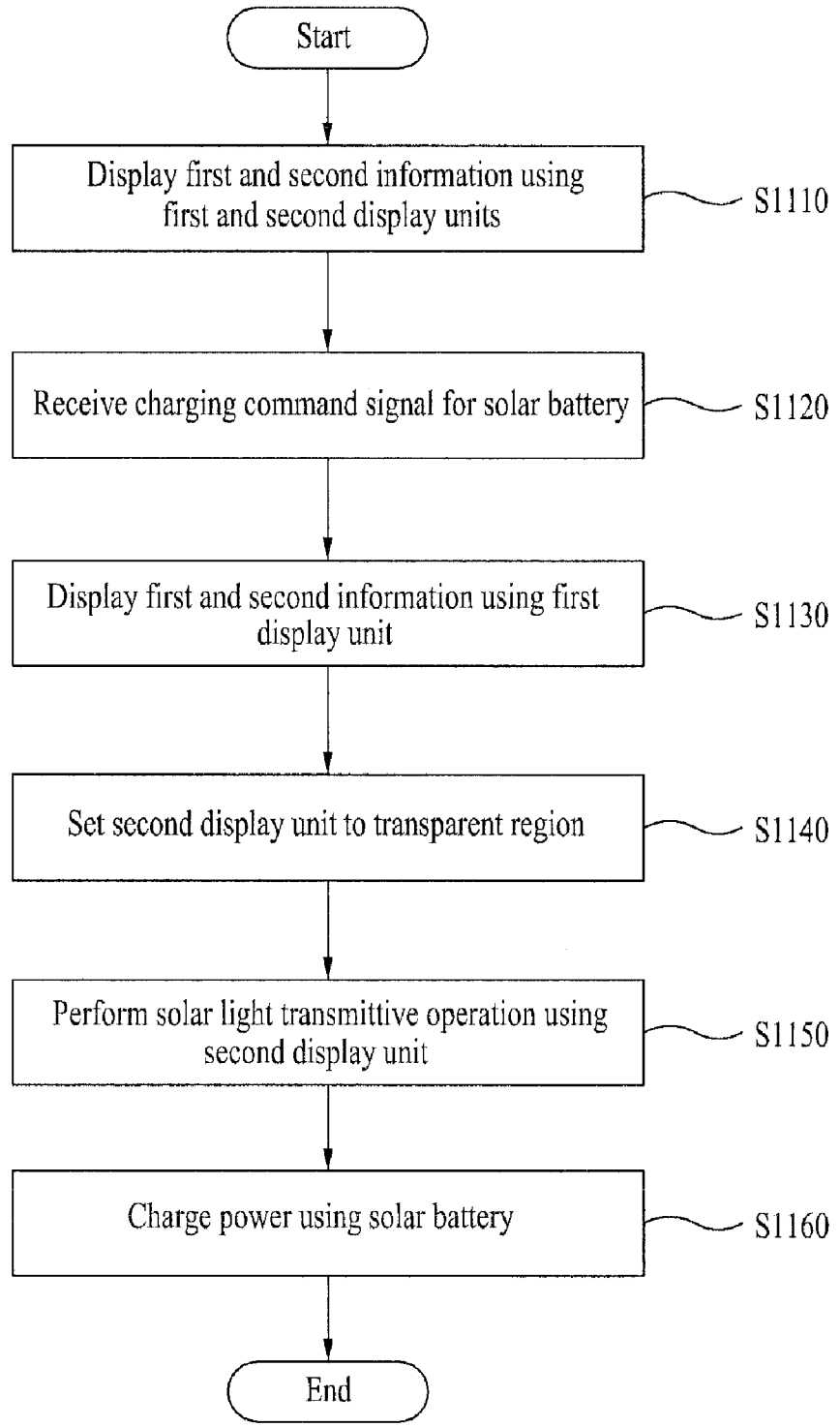
FIG. 11 is a flow chart of a method for controlling charging of a mobile terminal in accordance with one embodiment of the present invention.

FIG. 11 is a flow chart of a method for controlling charging of a mobile terminal using two different display units in accordance with one embodiment of the present invention. For convenience of description, it is supposed that two different display units are the first and second display units 151-1 and 151-2.

As shown in FIG. 11, the mobile terminal 100 displays first information and second information respectively by using the first and second display units 151-1 and 151-2 under the control of the controller 180 (S1110).

At this time, the first and second display units 151-1 and 151-2 may be arranged on the same face (for example, front face), or different faces (for example, front/rear faces) of the mobile terminal 100.

For example, the first display unit 151-1 is an opaque display means that cannot control transparency, and performs information display operation. The second display unit 151-2 is a transparent display means that can control transparency, and selectively performs information display operation and solar light transmittive operation depending on transparency.

Also, the first and second display units 151-1 and 151-2 can respectively be operated as touchscreens together with the touchpad.

The mobile terminal 100 receives a charging command signal of the solar battery 192 through the user input unit 130 (S1120).

Also, the mobile terminal 100 may receive a charging area control signal together with the charging command signal through the user input unit 130.

For description of the step S1120 for input of the charging command signal and the charging area control signal, refer to the step S410 of FIG. 4A.

Also, the touch action corresponding to the charging event or the charging area event can be performed for the first display unit 151-1 or the second display unit 151-2.

If the charging command signal is inputted, the mobile terminal 100 can set the solar battery charging mode.

If the charging command signal is inputted in the step S1120 (or if the solar battery charging mode is set), the mobile terminal 100 displays first information and second information, which are displayed respectively by the first and second display units 151-1 and 151-2 in the step S1110, by using the first display unit 151-1 under the control of the controller 180 (S1130).

The display step S1130 will be described in detail with reference to FIG. 12A to FIG. 12D.

Figure 12A:
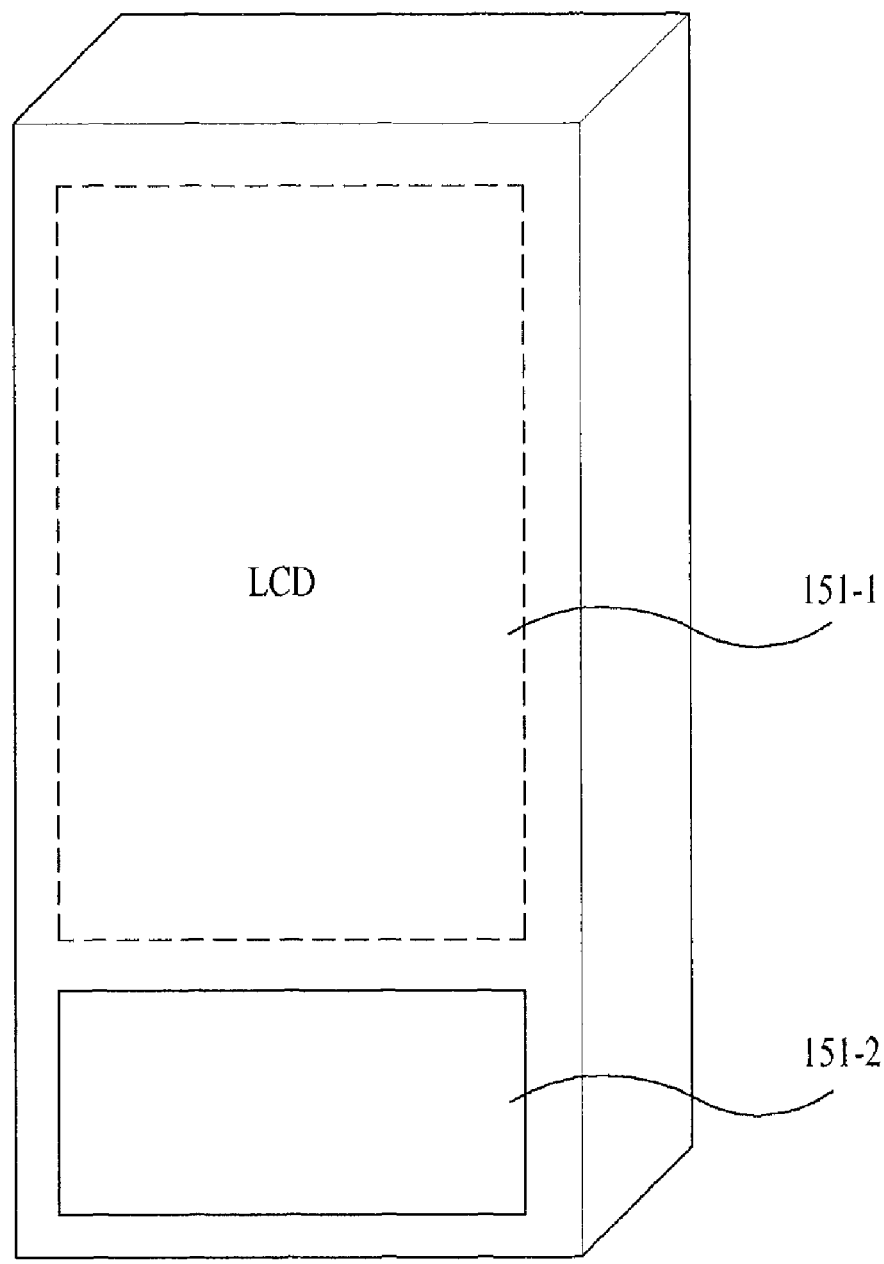

As shown in FIG. 12A, the first and second display units 151-1 and 151-2 can together be provided on the front face of the mobile terminal. For example, the first display unit 151-1 includes LCD while the display unit 151-2 includes TOLED.

Referring to FIG. 12B, if the mobile terminal 100 enters the solar battery charging mode (a) in a state that a phone number list is displayed on the first display unit 151-1 and a virtual key pad is displayed on the second display unit 151-2 (phone number search state), the mobile terminal 100 can display the phone number list and the virtual key pad together on the first display unit 151-1 (b).

At this time, the first display unit 151-1 may display the phone number list or the virtual key pad by reducing them, display the virtual key pad to be overlapped with the phone number list (overlay), or scroll display the phone number list.

Also, although not shown, the mobile terminal 100 may display the phone number list and the virtual key pad together even in a data input mode (message input mode, memo input mode, etc.) as well as the phone number search state.

Figure 12C:
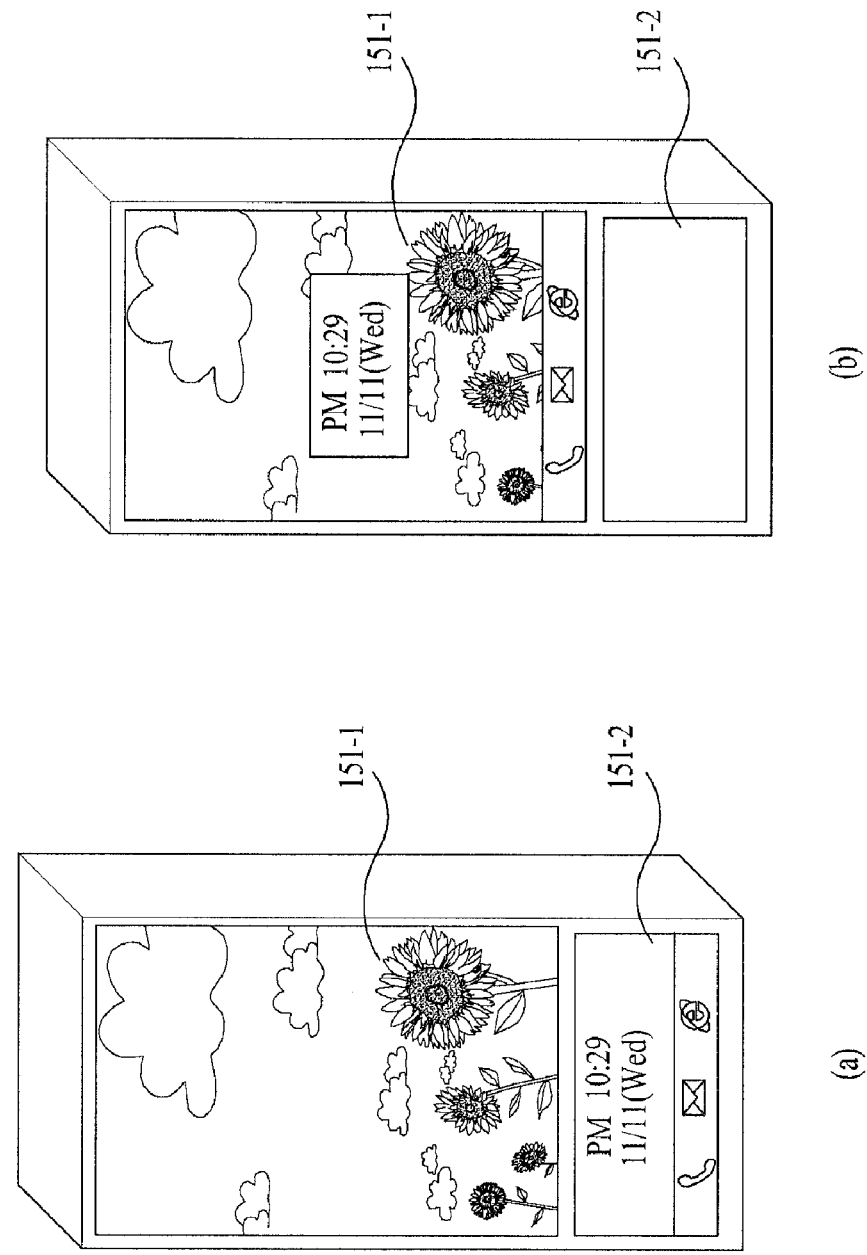

Referring to FIG. 12C, if the mobile terminal 100 enters the solar battery charging mode (a) in a state that a desktop wallpaper image is displayed on the first display unit 151-1 and terminal status information is displayed on the second display unit 151-2, the mobile terminal 100 can display the desktop wallpaper image and the terminal status information together on the first display unit 151-1 (b).

At this time, the first display unit 151-1 may overlay or popup-display the terminal status information (indicator, time information, hot key icon, etc.) for the desktop wallpaper image.

Figure 12D:
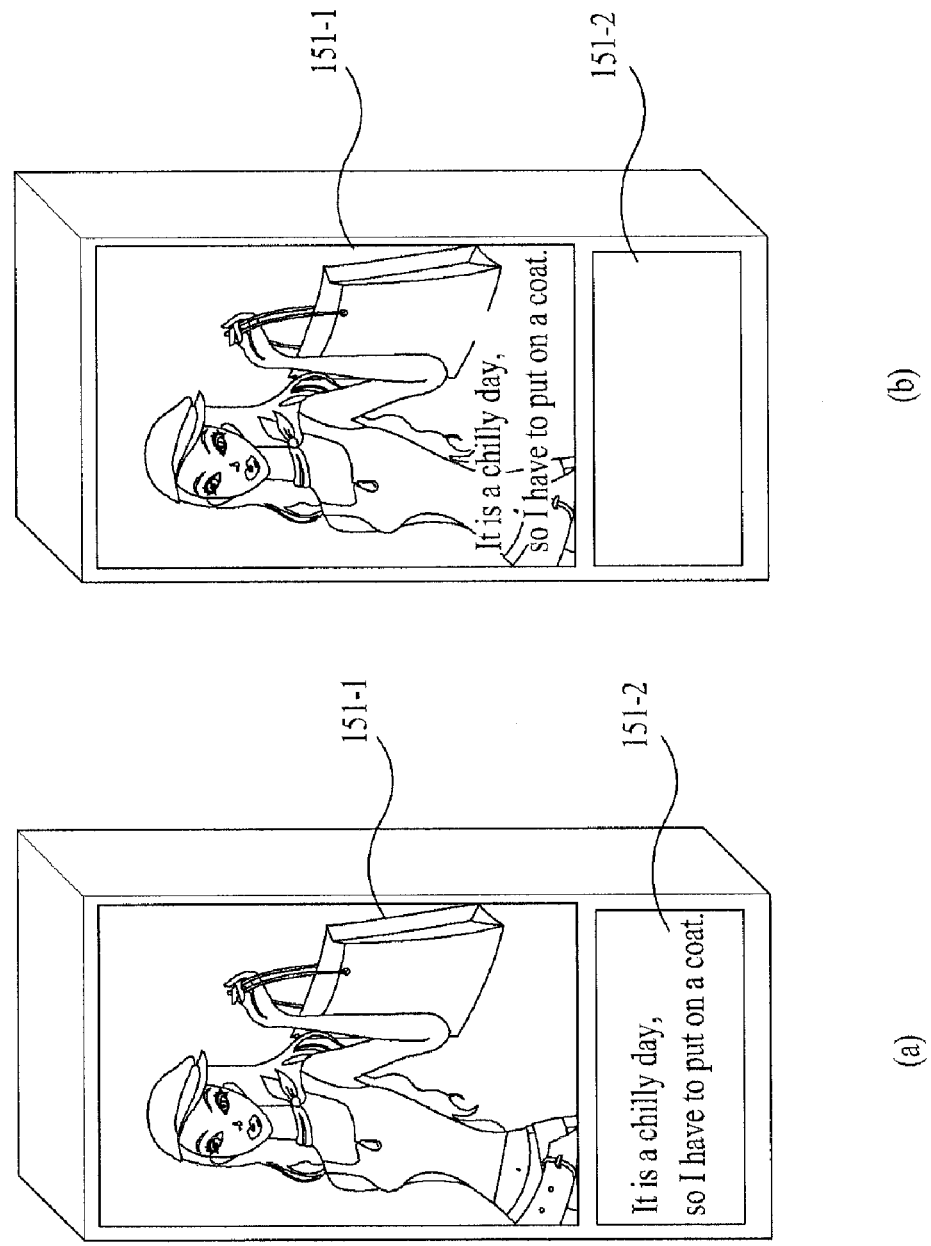

Referring to FIG. 12D, if the mobile terminal 100 enters the solar battery charging mode (a) in a state that image (still image or moving image) is displayed on the first display unit 151-1 and predetermined text is displayed on the second display unit 151-2, the mobile terminal 100 can display the image and text information together on the first display unit 151-1 (b).

At this time, the first display unit 151-1 may overlay or popup-display the text information for the image.

Meanwhile, in FIG. 12B(b), FIG. 12C(b), and FIG. 12D(b), the second display unit 151-2 is set to the transparent region to perform the solar light transmittive operation (this will be described later).

Also, although not shown, if the remaining power level reaches a certain reference level at the states of FIG. 12B(b), FIG. 12C(b), and FIG. 12D(b) (full charging level or 90% of full charging level), the states of FIG. 12B(b), FIG. 12C(b), and FIG. 12D(b) can return to the states of FIG. 12B(a), FIG. 12C(a), and FIG. 12D(a), respectively.

Returning to FIG. 11, if the charging command signal is received in the step S1120 (or if the solar battery charging mode is set), the mobile terminal 100 sets the second display unit 151-2 to the transparent region (S1140) and performs the solar light transmittive operation by using the second display unit 151-2 (S1150), under the control of the controller 180.

The mobile terminal 100 may set a partial region of the second display unit 151-2 to the transparent region and the other region of the second display unit 151-2 to the opaque region, as the case may be. Accordingly, partial information of the second information is displayed on the first display unit 151-1, and the other information of the second information is displayed on the second display unit 151-2.

Meanwhile, if it is determined that the remaining power level of the power supply unit 190 is less than a certain level, the mobile terminal 100 automatically sets the second display unit 151-2 to the transparent region and performs the solar light transmittive operation by using the second display unit 151-2.

The mobile terminal 100 charges the power generated from the solar light transmitted through the second display unit 151-2 by using the solar battery 192, under the control of the controller 180 (S1160).

The solar battery 192 is arranged below the second display unit 151-2 to form a layered structure with the second display unit 151-2, and has the same area as that of the second display unit 151-2. Accordingly, the solar light transmitted through the second display unit 151-2 can be received by the solar battery 192.

Hereinafter, a structure that the first and second display units 151-1 and 151-2 are arranged on different faces will be described in detail with reference to FIG. 13A to FIG. 13C.

Figure 13A:
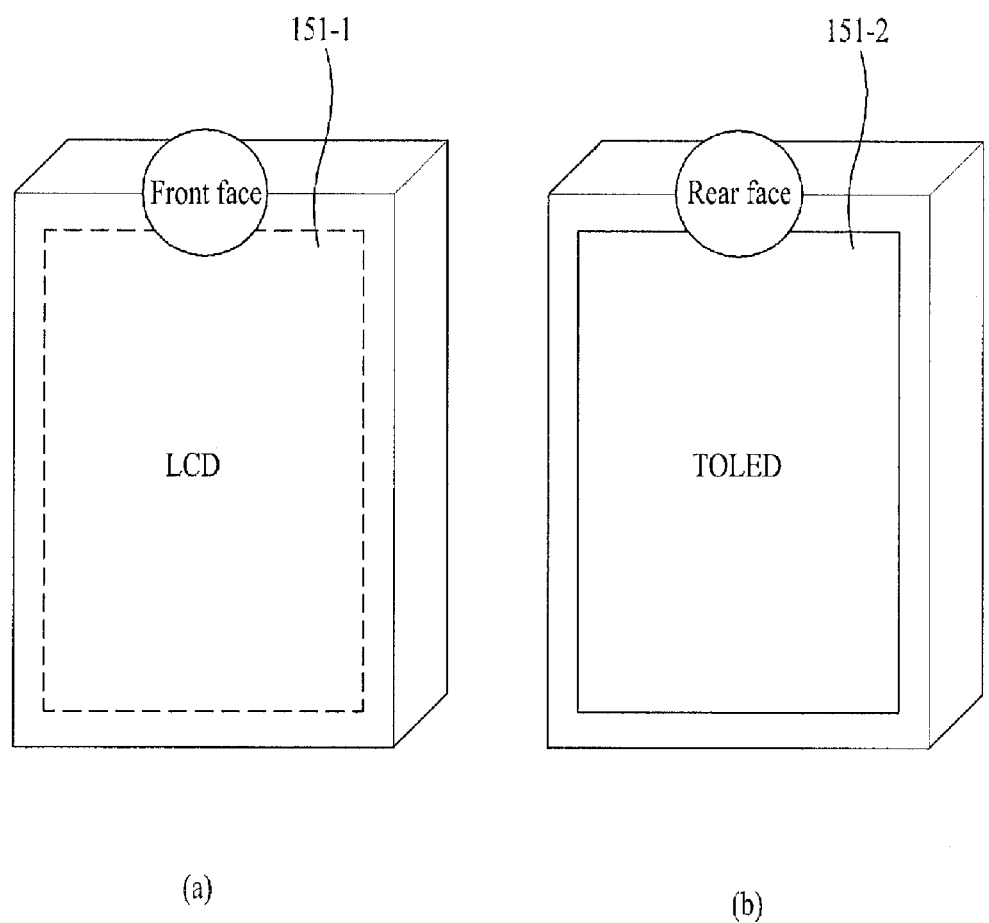
FIG. 13A to FIG. 13C are schematic views of first and second displays arranged on different faces in accordance with one embodiment of the present invention.
Figure 13B:
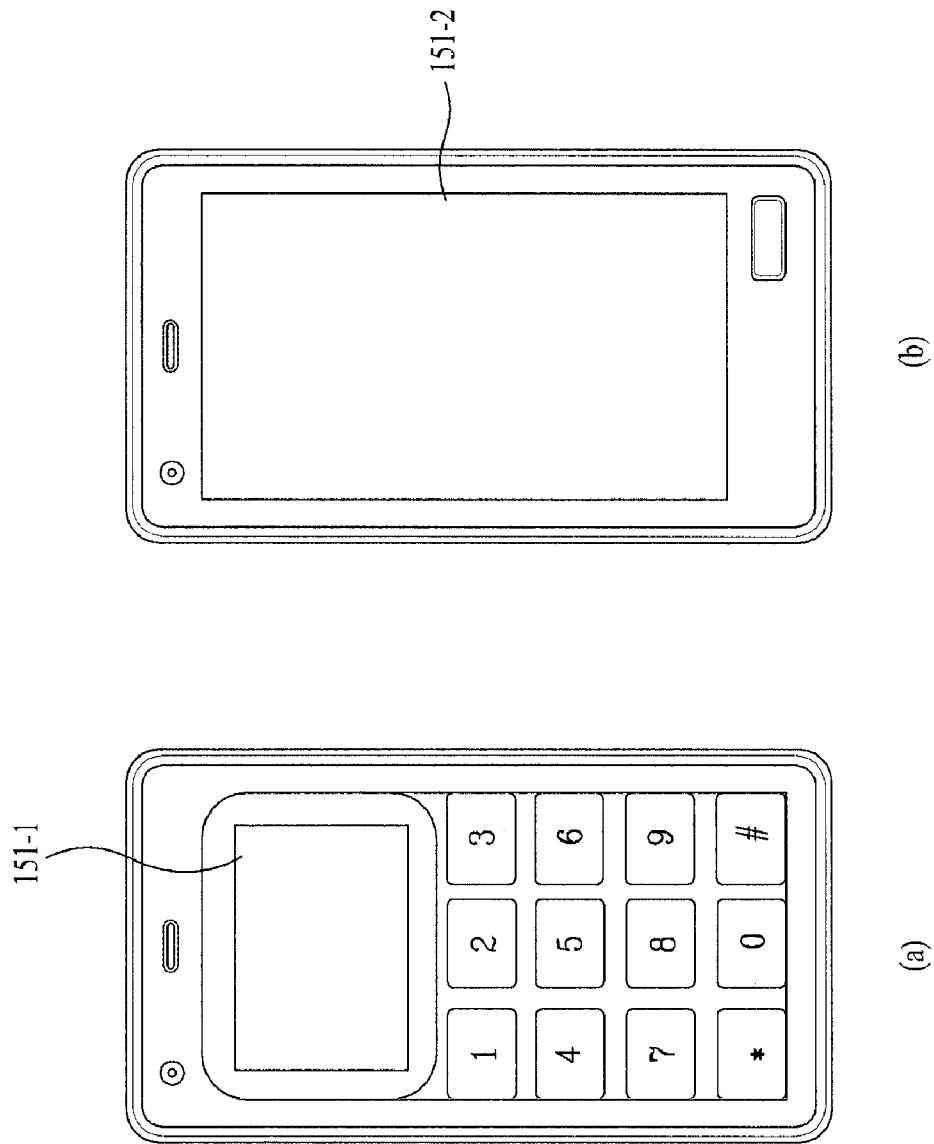

Referring to FIG. 13A and FIG. 13B, the first display unit 151-1 is an opaque display means (for example, LCD) and is arranged on the front face of the mobile terminal. The second display unit 151-2 is a transparent display means (for example, TOLED) and is arranged on the rear face of the mobile terminal.

Figure 13C:
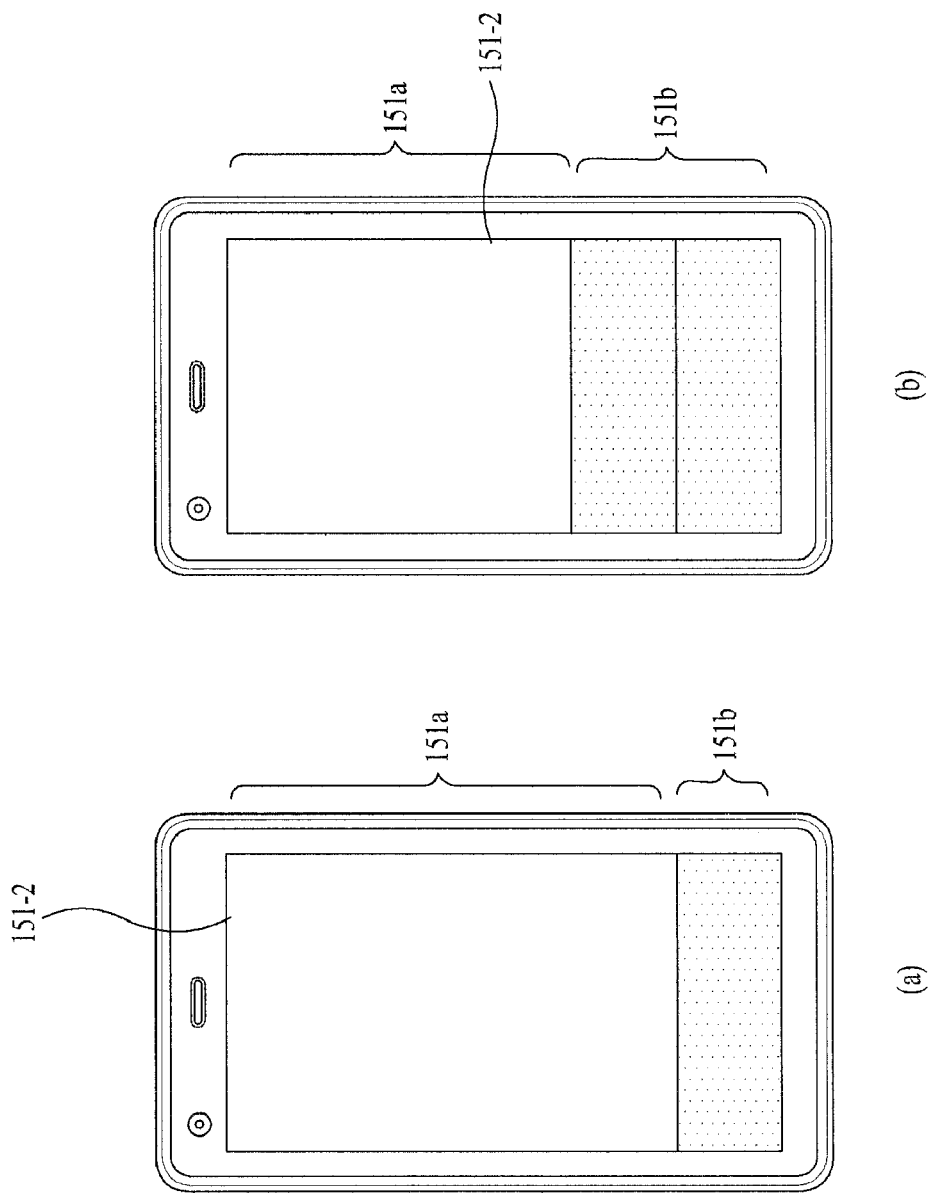

Referring to FIG. 13C, the second display unit 151-2 can enlarge the area of the transparent region gradually as the charging area event is inputted. For example, examples of the charging area event include terminal swing of a certain number of times and terminal turning of a certain number of times. Accordingly, the more the number of times of terminal swing or terminal turning is, the wider the area of the transparent region is.

Hereinafter, a process of outputting predetermined announcement information through a second display unit 151-2 if first and second display units 151-1 and 151-2 are arranged different faces will be described in detail with reference to FIG. 14A to FIG. 14C.

Figure 14A:
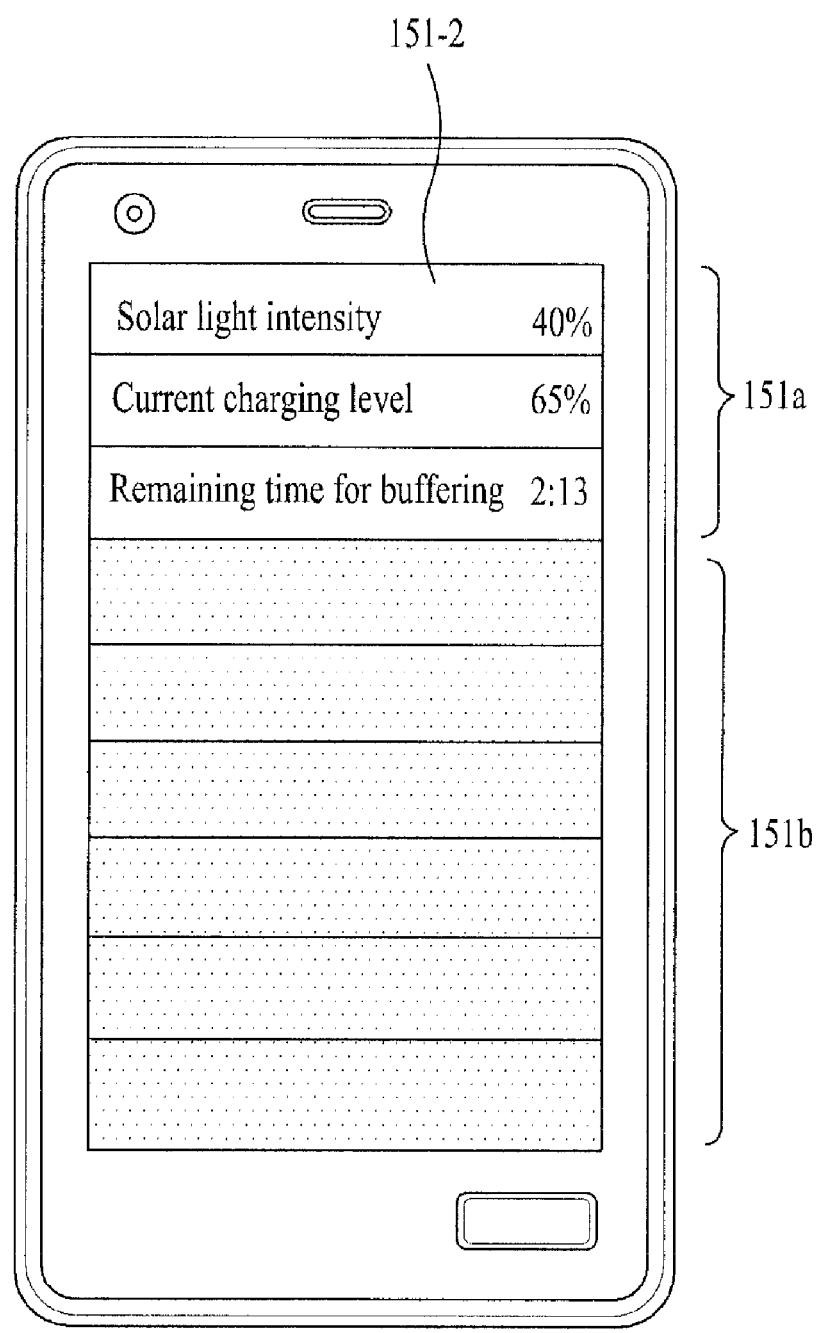
FIG. 14A to FIG. 14C are schematic views of a screen outputting predetermined announcement information through a second display if a first display and the second display are arranged on different faces in accordance with one embodiment of the present invention.

Referring to FIG. 14A, the mobile terminal 100 sets a part of the second display unit 151-2 to the opaque region in the solar battery charging mode and displays solar battery charging information (for example, solar light intensity, current charging level, and remaining time for buffering) on the set opaque region.

Figure 14B:
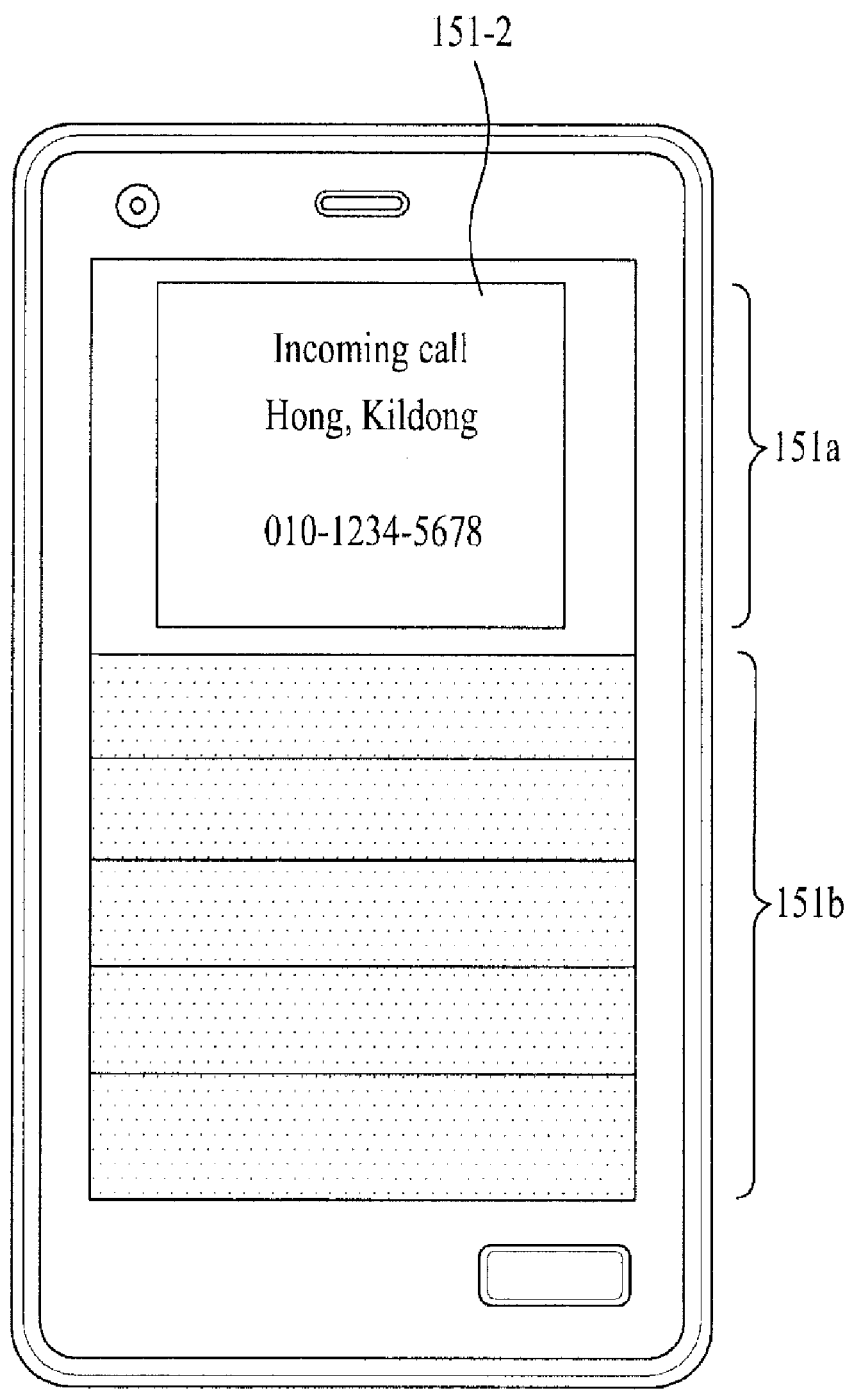

Referring to FIG. 14B, if a call signal is received in the solar battery charging mode, the mobile terminal 100 sets a part of the second display unit 151-2 to the opaque region and displays information of the received call signal (for example, call acknowledgement message, information (name and phone number) of the other party which has received the call signal, and message contents) on the set opaque region.

Figure 14C:
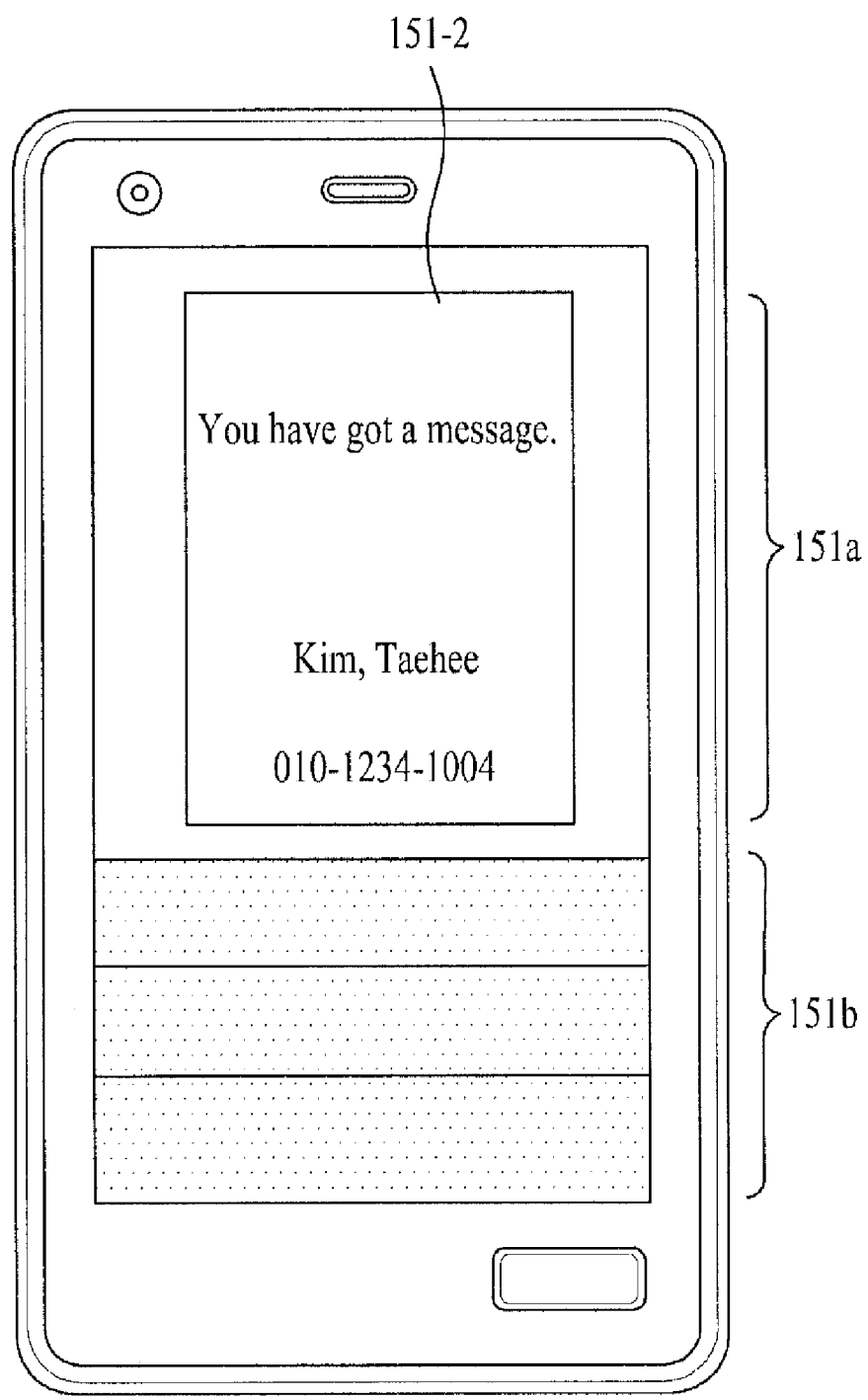

Referring to FIG. 14C, if a message is received in the solar battery charging mode, the mobile terminal 100 sets a part of the second display unit 151-2 to the opaque region and displays information of the received message (for example, message announcement note, information (name and phone number) of the other party which has received the message, and message contents) on the set opaque region.

In FIG. 14A to FIG. 14C, the mobile terminal can continue to perform the solar light transmittive operation by using the other region except for the partial region of the second display unit 151-2.

According to one embodiment of the present invention, the above-described broadcast controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The configurations and methods of the aforementioned embodiments are not limited to the aforementioned mobile terminal and method for controlling charging thereof. All or part of the aforementioned embodiments can be configured by selective combination, whereby various modifications can be made in the embodiments.

The aforementioned mobile terminal and method for controlling charging thereof in respect of at least one embodiment of the present invention have the following advantages.

First, if one transparent display unit is provided, since the mobile terminal can set the transparent display unit to the opaque region and the transparent region in the solar battery charging mode, the mobile terminal can perform the transmittive operation of solar light, which is to enter the solar battery, through the transparent region while performing information display operation through the opaque region.

Second, if two display units are provided, since the mobile terminal can set the second display unit to the transparent region in the solar battery charging mode, the mobile terminal can perform the transmittive operation of solar light, which is to enter the solar battery, by using the second display means while performing information display operation by using the first display means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a power supply unit that includes a solar battery;
a transparent display over the solar battery;
a user input unit to receive a charge command signal relating to the solar battery; and
a controller to set a first region of the transparent display to an opaque region and to set a second region of the transparent display to a transparent region when the charge command signal is received, and the controller to control the transparent display to perform an information display operation on the opaque region and to perform a solar light receiving operation on the transparent region for charging using the solar battery,
wherein the controller controls the solar battery to charge power based on solar light received at the transparent region of the transparent display.

2. The mobile terminal of claim 1, wherein the user input unit receives a charge area control signal for the transparent display, and the controller controls areas of the opaque region and the transparent region, respectively, to correspond to the received charging area control signal.

3. The mobile terminal of claim 2, wherein the user input unit receives an area rate of the transparent region, the area rate being previously designated to correspond to the charging area control signal.

4. The mobile terminal of claim 1, wherein the transparent display displays a first screen on the opaque region by reducing or scrolling it under the control of the controller when the charge command signal is received while displaying the first screen using the transparent display.

5. The mobile terminal of claim 1, wherein the controller reduces an area of the transparent region to a prescribed rate when a charge level of the solar battery is greater than a first reference level, and the controller enlarges the area of the transparent region to a prescribed rate when the charge level of the solar battery is less than a second reference level.

6. The mobile terminal of claim 1, wherein the controller releases setup of the transparent region when a charge level of the solar battery is greater than a prescribed reference level, and the controller sets the entire of the transparent display to the opaque region.

7. The mobile terminal of claim 1, wherein the transparent display displays an indicator indicating a charge level of the solar battery on part of the opaque region.

8. A mobile terminal comprising:
a power supply unit that includes a solar battery;
a display over the solar battery; and
a controller to determine whether a power level of the power supply unit is less than a prescribed reference level, to set a first region of the display to an opaque region and to set a second region to a transparent region when the power level is less than the prescribed reference level, and to control the display to perform an information display operation on the opaque region and a solar light receiving operation on the transparent region for charging using the solar battery,
wherein the controller controls the solar battery to charge power based on solar light received through the transparent region.

9. A mobile terminal comprising:
a power supply unit that includes a solar battery;
a display unit that includes a first display unit to display first information and a second display unit to display second information, the second display unit being over a face of the solar battery;
a user input unit to receive a charge command signal for the solar battery; and
a controller to control the first display unit to display the first information and the second information in response to receiving the charge command signal, and to control the second display unit to perform a solar light operation for charging using the solar battery by setting the second display unit to a transparent region,
wherein the controller controls the solar battery to charge power based on solar light received through the second display unit.

10. The mobile terminal of claim 9, wherein when an event occurs during a charge operation using the solar battery, the second display unit displays announcement information of the event.

11. The mobile terminal of claim 9, wherein the first display unit and the second display unit are on a same face of the mobile terminal or are on opposite faces of the mobile terminal.

12. A method for controlling charging of a mobile terminal that includes a solar battery and a transparent display over the solar battery, the method comprising:
receiving a charge command signal related to the solar battery;
setting a first region of the transparent display to an opaque region and a second region of the transparent display to a transparent region when the charge command signal is received;
performing an information display operation on the opaque region and a solar light receiving operation on the transparent region for charging using the solar battery; and
charging power based on solar light received through the transparent region by using the solar battery.

13. The method of claim 12, further comprising:
receiving a charge area control signal for the transparent display; and
controlling areas of the opaque region and the transparent region, respectively, to correspond to the received charge area control signal.

14. The method of claim 12, wherein when the charge command signal is received while displaying a first screen using the transparent display, the first screen is displayed by being reduced or scrolled relative to the second screen.

15. The method of claim 12, further comprising:
determining a charge level of the solar battery;
reducing the area of the transparent region to a certain rate when the charge level of the solar battery is greater than a first reference level; and
enlarging the area of the transparent region to a certain rate when the charge level of the solar battery is less than a second reference level.

16. The method of claim 12, further comprising:
determining a charge level of the solar battery; and
releasing setup of the transparent region and setting the entire of the transparent display to the opaque region when the charge level of the solar battery is greater than a prescribed reference level.

17. A method for controlling charging of a mobile terminal that includes a solar battery and a transparent display over the solar battery, the method comprising:
determining whether a power level of the mobile terminal is less than a prescribed reference level;
setting a first region of the transparent display to an opaque region and a second region of the transparent display to a transparent region when the power level is less than the prescribed reference level;
performing an information display operation on the opaque region and a solar light operation on the transparent region for charging using the solar battery; and
charging power generated based on light received through the transparent region by using the solar battery.

18. A method for controlling a mobile terminal that includes a solar battery and a plurality of display units, the method comprising:
displaying first information and second information by respectively using first and second display units of the plurality of display units;
receiving a charge command signal for the solar battery;
displaying the first information and the second information by using the first display unit when the charge command signal is received;
performing a solar light operation for charging using the solar battery by setting the second display unit to a transparent region when the charge command signal is received; and
charging power based on solar light received through the second display unit by using the solar battery.

19. The method of claim 18, further comprising:
sensing that an event occurs while charging the power; and
displaying announcement information of the event using the second display unit.

* * * * *